US010462766B2

(12) United States Patent
Agiwal et al.

(10) Patent No.: US 10,462,766 B2
(45) Date of Patent: Oct. 29, 2019

(54) METHOD AND APPARATUS FOR PAGING BETWEEN DEVICES PERFORMING DIRECT COMMUNICATION

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/036,737

(22) PCT Filed: Nov. 14, 2014

(86) PCT No.: PCT/KR2014/010981
§ 371 (c)(1),
(2) Date: May 13, 2016

(87) PCT Pub. No.: WO2015/072789
PCT Pub. Date: May 21, 2015

(65) Prior Publication Data
US 2016/0309447 A1  Oct. 20, 2016

(30) Foreign Application Priority Data
Nov. 14, 2013 (IN) .......................... 1297/KOL/2013

(51) Int. Cl.
*H04W 68/02* (2009.01)
*H04W 76/14* (2018.01)
(Continued)

(52) U.S. Cl.
CPC .......... *H04W 68/02* (2013.01); *H04B 7/0413* (2013.01); *H04B 7/0417* (2013.01);
(Continued)

(58) Field of Classification Search
CPC . H04W 4/005; H04W 76/028; H04W 76/023; H04W 48/12; H04B 7/0413
(Continued)

(56) References Cited

U.S. PATENT DOCUMENTS

2005/0030918 A1* 2/2005 Motegi ................. H04W 68/02
370/328
2009/0252125 A1* 10/2009 Vujcic ............... H04W 56/0045
370/336
(Continued)

FOREIGN PATENT DOCUMENTS

WO    2013/162196 A1   10/2013

OTHER PUBLICATIONS

ZTE, "Discussion of D2D Discovery", 3GPP TSG-RAN WG1 #74, R1-133149, Aug. 19-23, 2013, pp. 1-10, Barcelona, Spain.

*Primary Examiner* — Fred A Casca
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Provided is a method for paging between devices performing direct communication. The method includes determining, by a device, a direct connection with a target device performing the direct communication; transmitting, by the device, a dedicated resource request for paging signaling with the target device to a base station; and if dedicated resource information for the paging signaling is received from the base station, transmitting, by the device, a set up request for the direct connection to the target device based on the dedicated resource information.

6 Claims, 31 Drawing Sheets

(51) Int. Cl.
  H04B 7/0417 (2017.01)
  H04B 7/0413 (2017.01)
  H04W 8/00 (2009.01)
  H04L 5/00 (2006.01)
(52) U.S. Cl.
  CPC .......... *H04L 5/0055* (2013.01); *H04W 8/005* (2013.01); *H04W 76/14* (2018.02)
(58) Field of Classification Search
  USPC ......... 455/458, 515, 426.1, 434, 414.1, 41.2
  See application file for complete search history.

(56) References Cited

U.S. PATENT DOCUMENTS

| | | | |
|---|---|---|---|
| 2011/0317569 A1 | 12/2011 | Kneckt et al. | |
| 2013/0109301 A1 | 5/2013 | Hakola et al. | |
| 2013/0157670 A1 | 6/2013 | Koskela et al. | |
| 2013/0287012 A1* | 10/2013 | Pragada | H04W 76/045 370/338 |
| 2013/0343252 A1* | 12/2013 | Chakraborty | H04W 52/0261 370/311 |
| 2014/0148153 A1* | 5/2014 | Gleixner | H04W 4/005 455/426.1 |
| 2014/0194062 A1* | 7/2014 | Palin | H04W 4/008 455/41.2 |

* cited by examiner

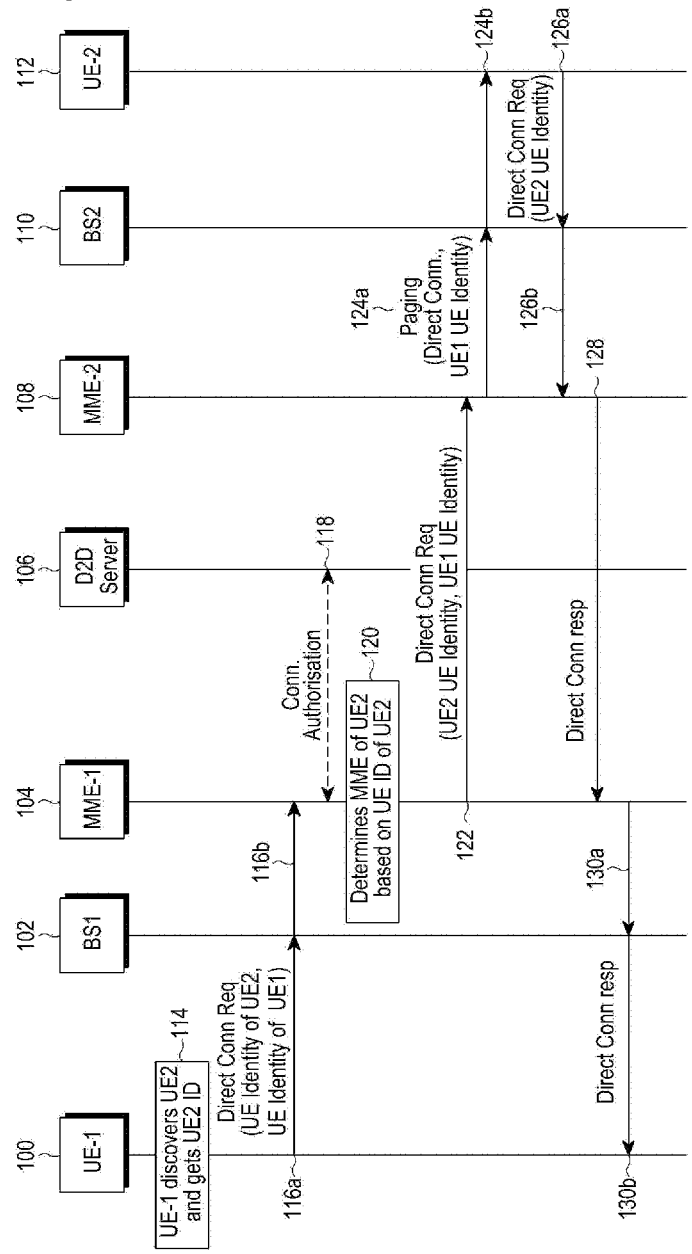
[Figure 1a]

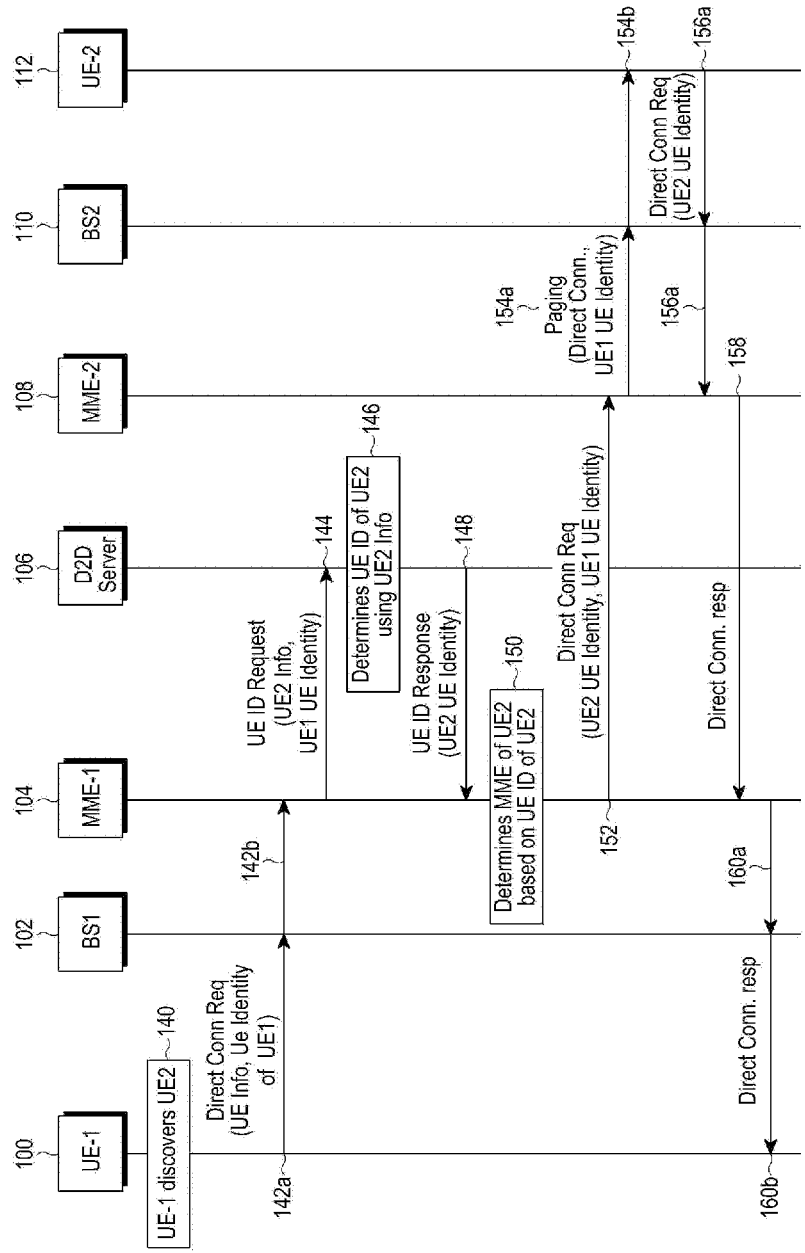

【Figure 2】
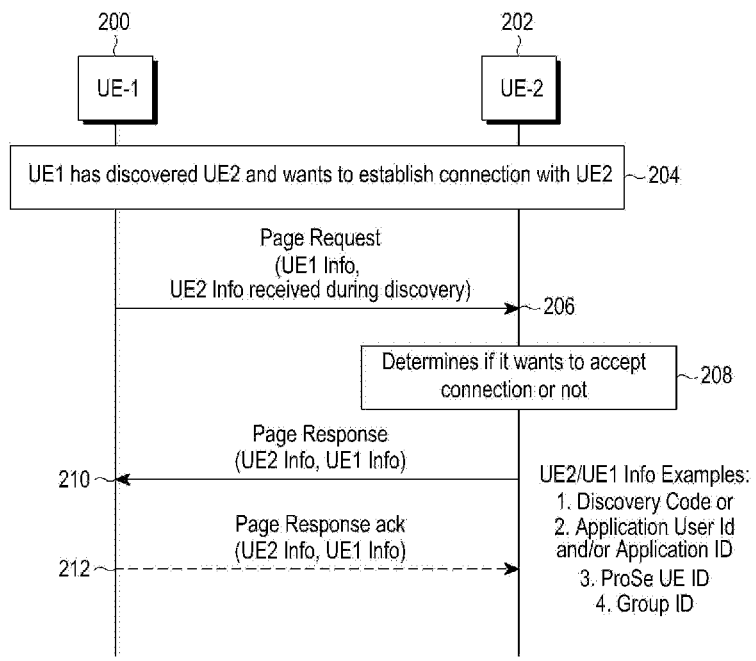

[Figure 3a]
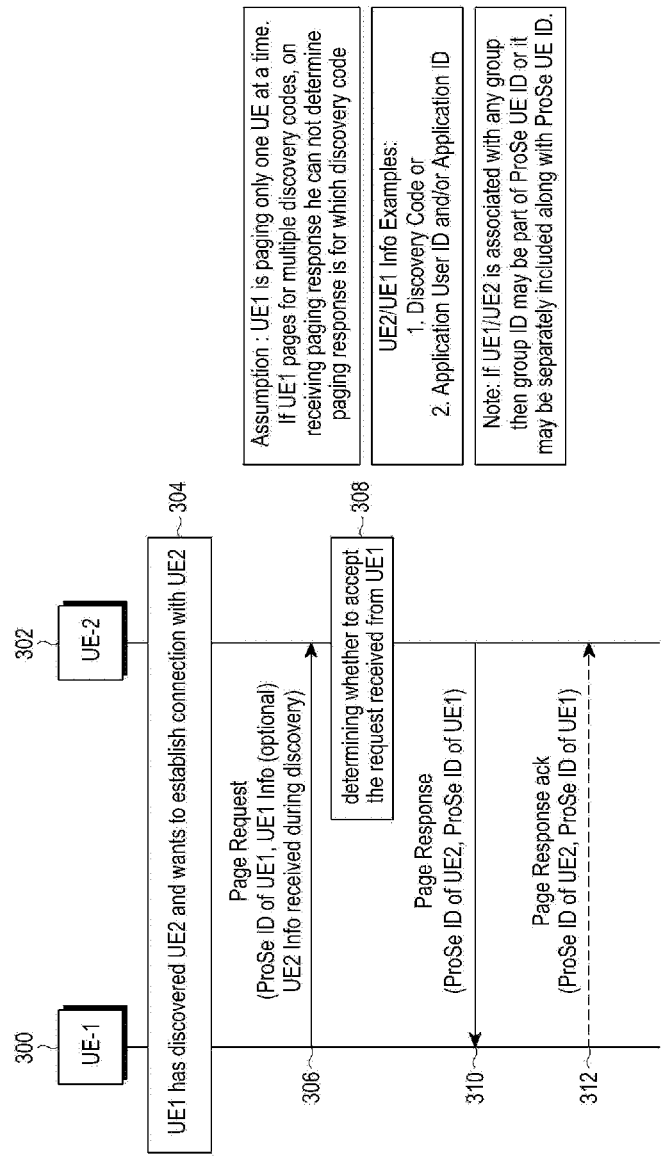

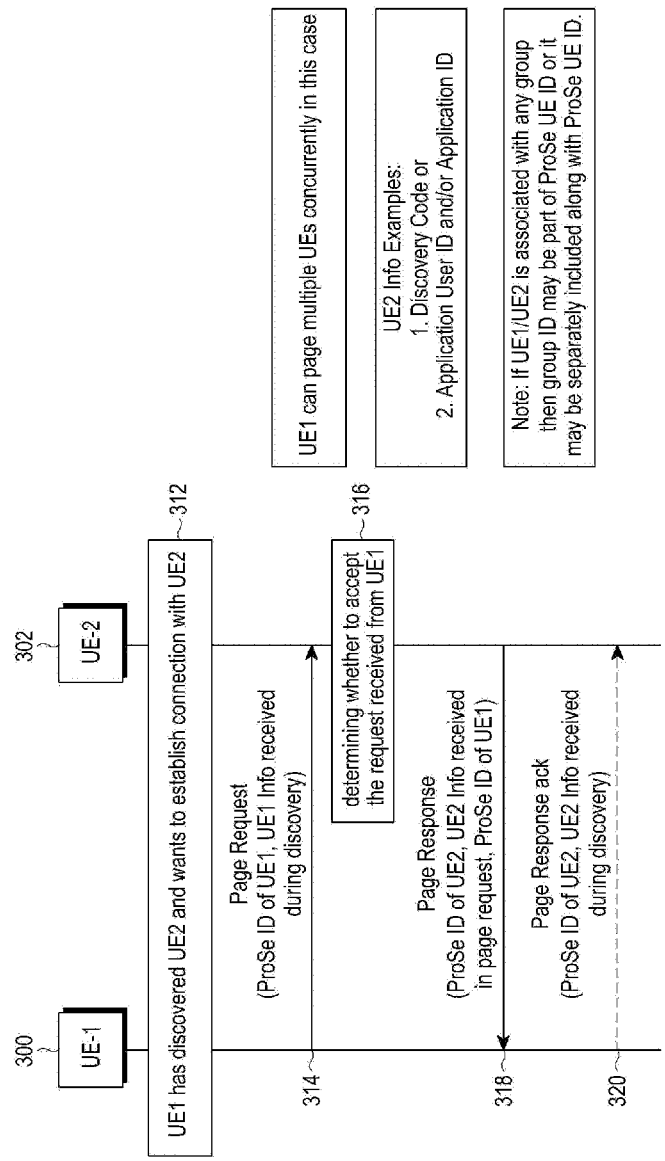
[Figure 3b]

【Figure 3c】
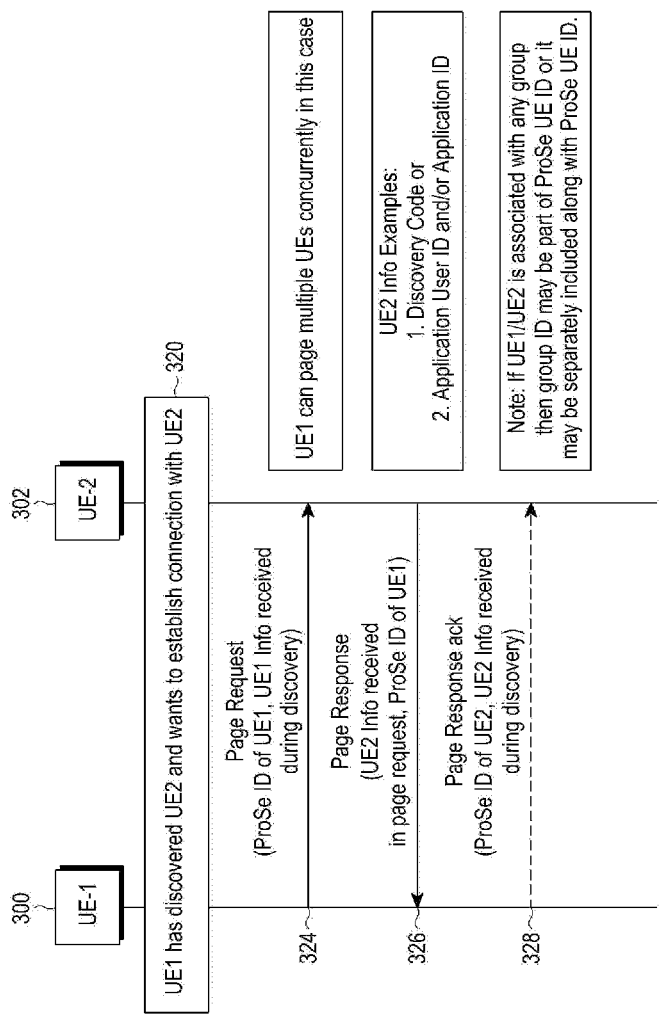
【Figure 4】
| Mode (Soliciting or Announcing) | Type (Open, Restricted, ProSe UE ID) | Discovery Information |
|---|---|---|
【Figure 5a】
| Mode (Soliciting or Announcing or Paging) | Discovery Info Type (Open, Restricted, ProSe UE ID) or Paging Info Type | Discovery Information or Paging Information |
|---|---|---|

【Figure 5b】

| Mode (Soliciting or Announcing) | Discovery Info Type (Open, Restricted, ProSe UE ID) | Discovery Information |
|---|---|---|

【Figure 5c】

| Mode (Paging) | Paging Info Type (Request, Response, Ack) | Paging Information |
|---|---|---|

【Figure 6a】

| Message Type or PDU Type | Discovery PDU / Discovery Message or Paging Message |
|---|---|

【Figure 6b】

| Message Type or PDU Type = Discovery | Mode (Soliciting or Announcing) | Discovery Info Type (Open, Restricted, ProSe UE ID) | Discovery Information |
|---|---|---|---|

【Figure 6c】

| Message Type or PDU Type = Paging | Paging Info Type (Request, Response, Ack) | Paging Information |
|---|---|---|

【Figure 7a】

| Message Type or PDU Type | Discovery PDU / Discovery Message or Paging Message |
|---|---|

【Figure 7b】

| Message Type or PDU Type = Soliciting, Announcing | Discovery Info Type (Open, Restricted, ProSe UE ID) | Discovery Information |
|---|---|---|

【Figure 7c】

| Message Type or PDU Type = Paging Request, Response, Ack | Paging Information |
|---|---|

【Figure 8】

| Discovery PDU / Discovery Message |
|---|
| Paging message |
| CRC indicates whether paging message or discovery message is there |

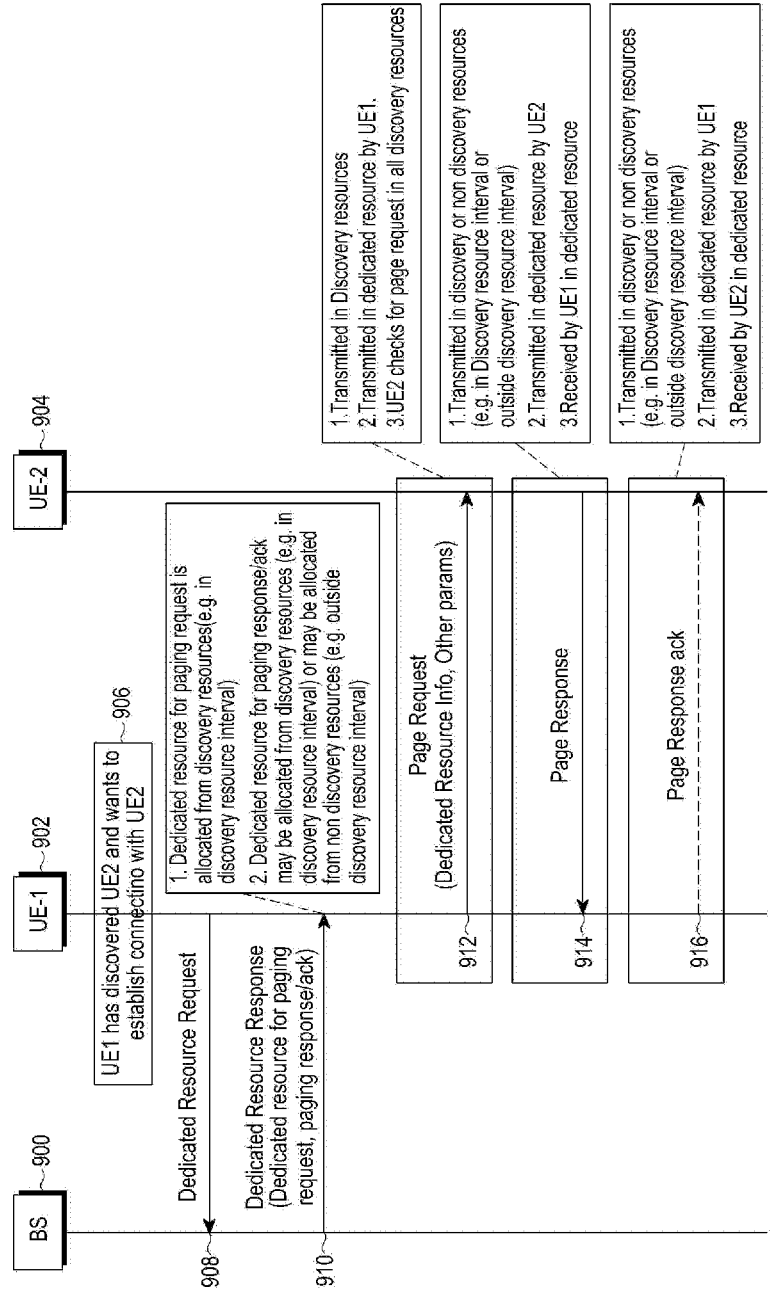
[Figure 9]

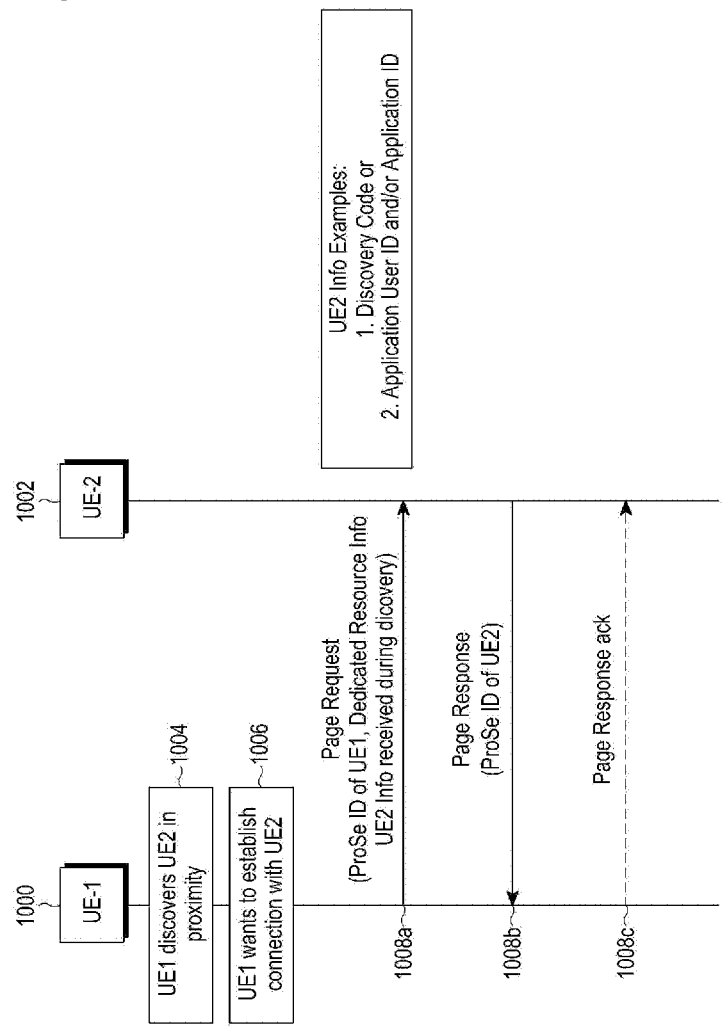

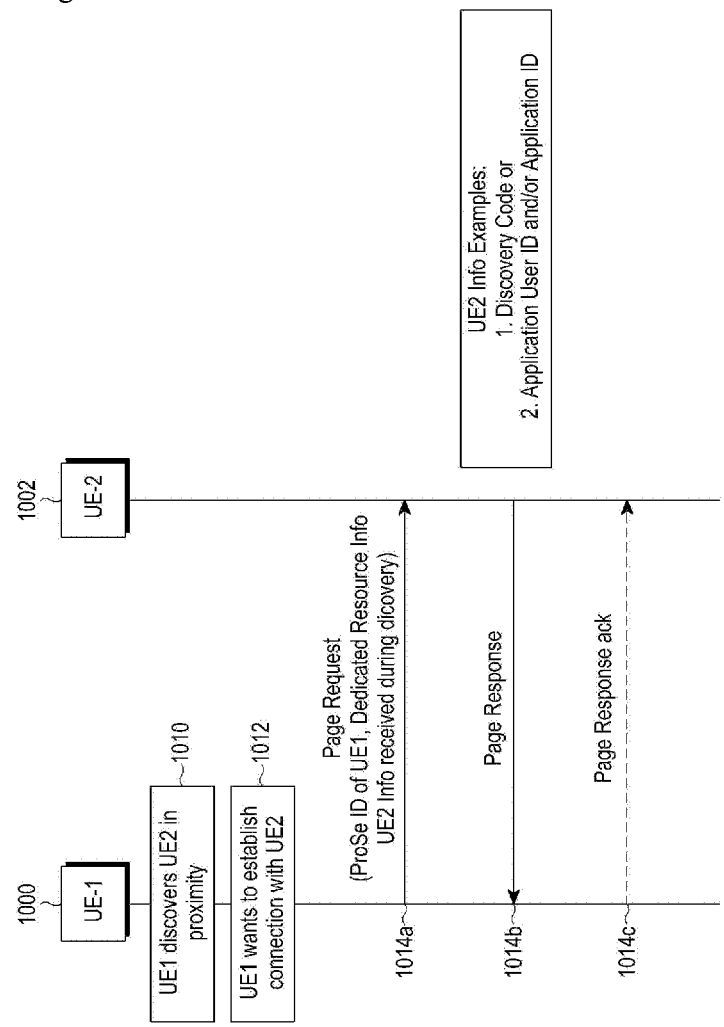
[Figure 10b]

【Figure 10c】
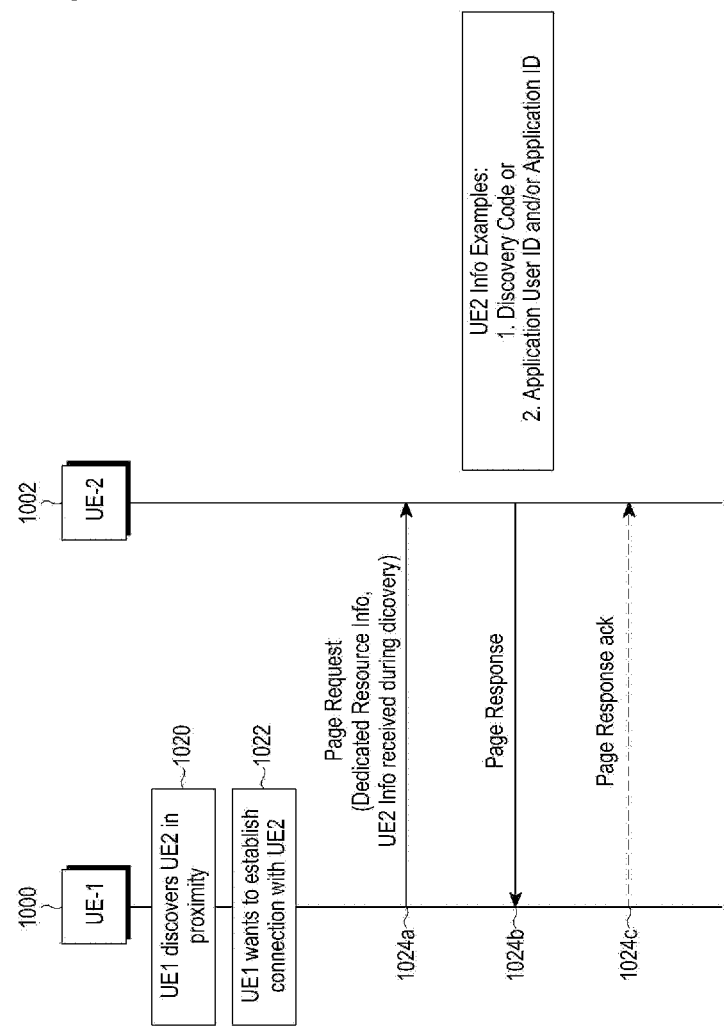

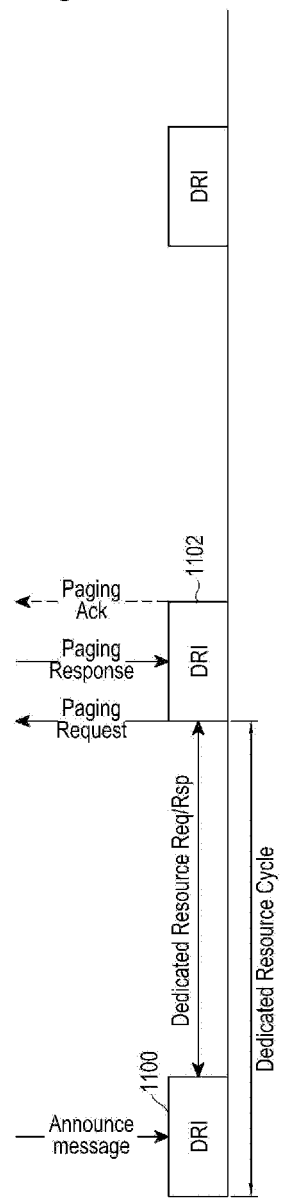
[Figure 11a]

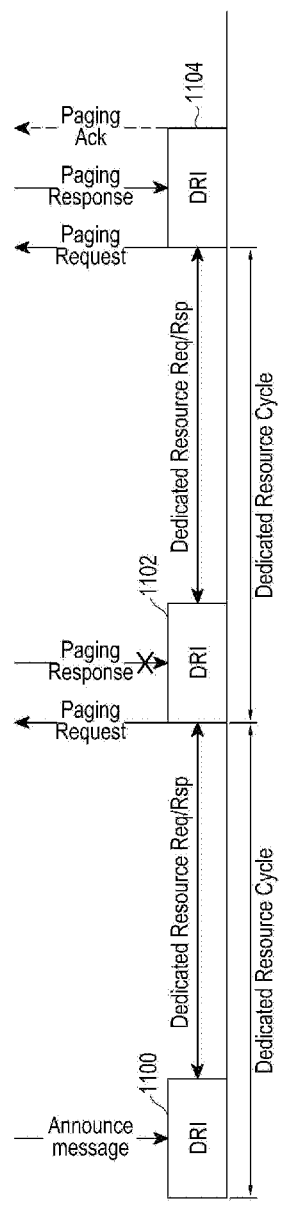

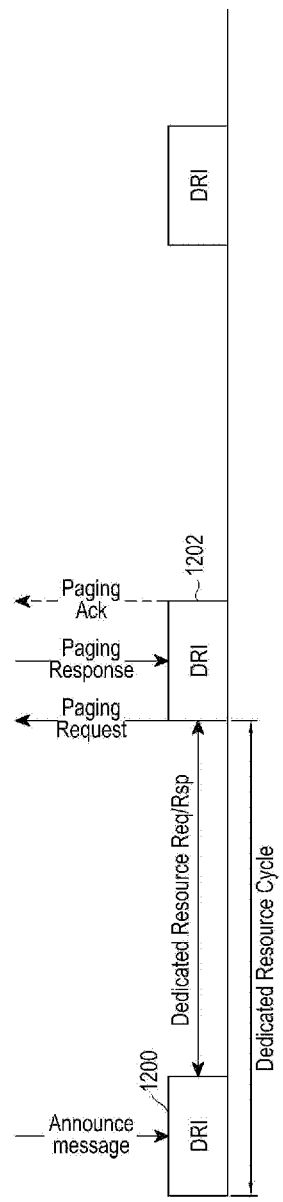

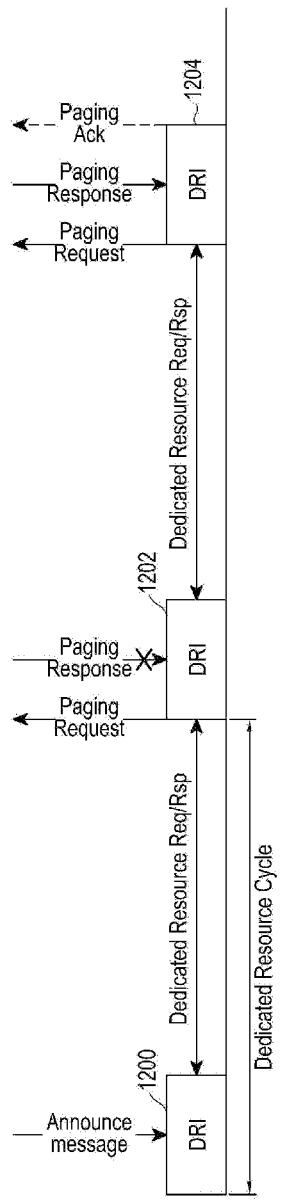
[Figure 12b]

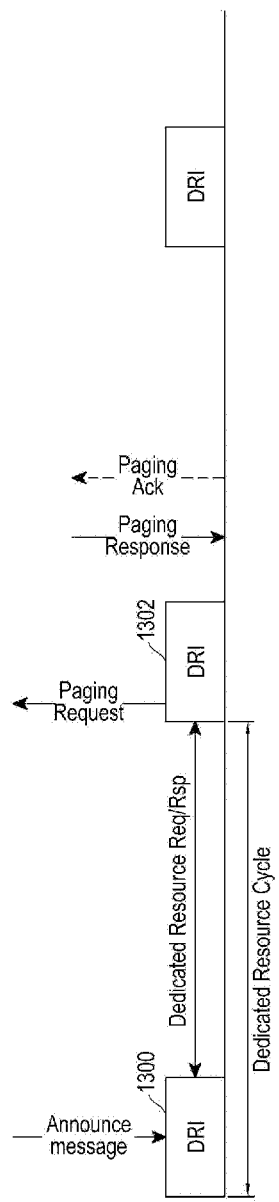

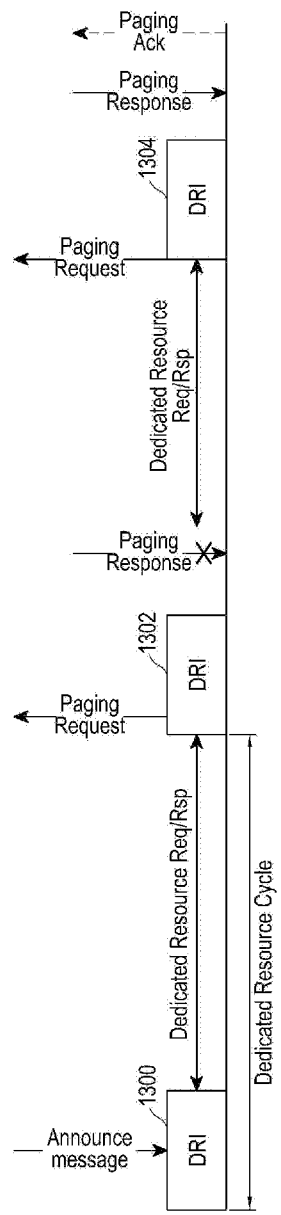

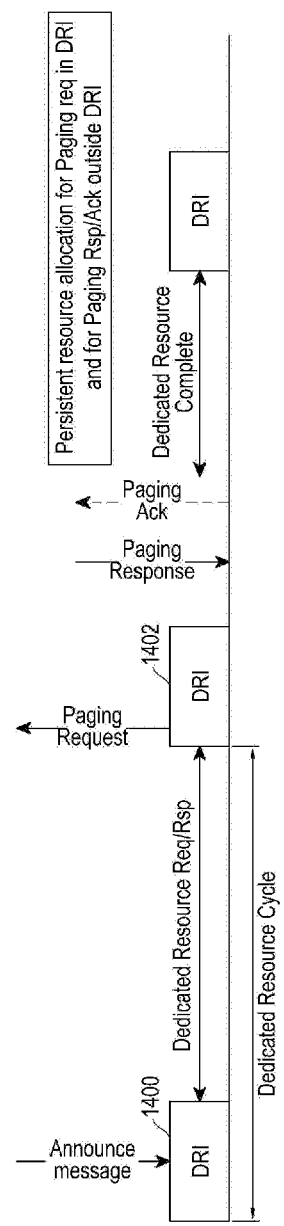

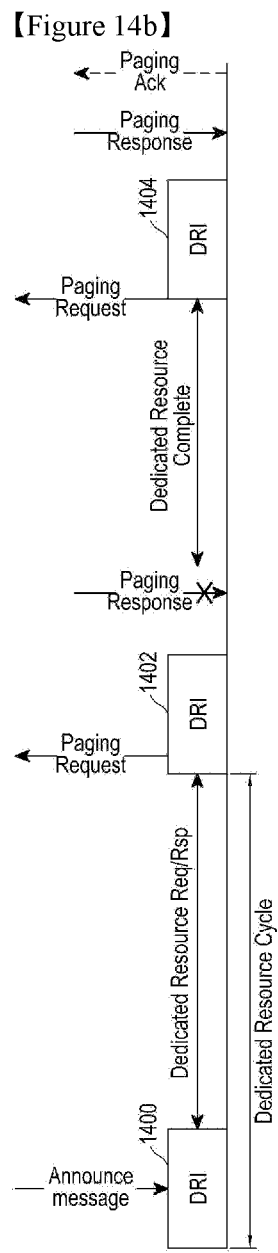

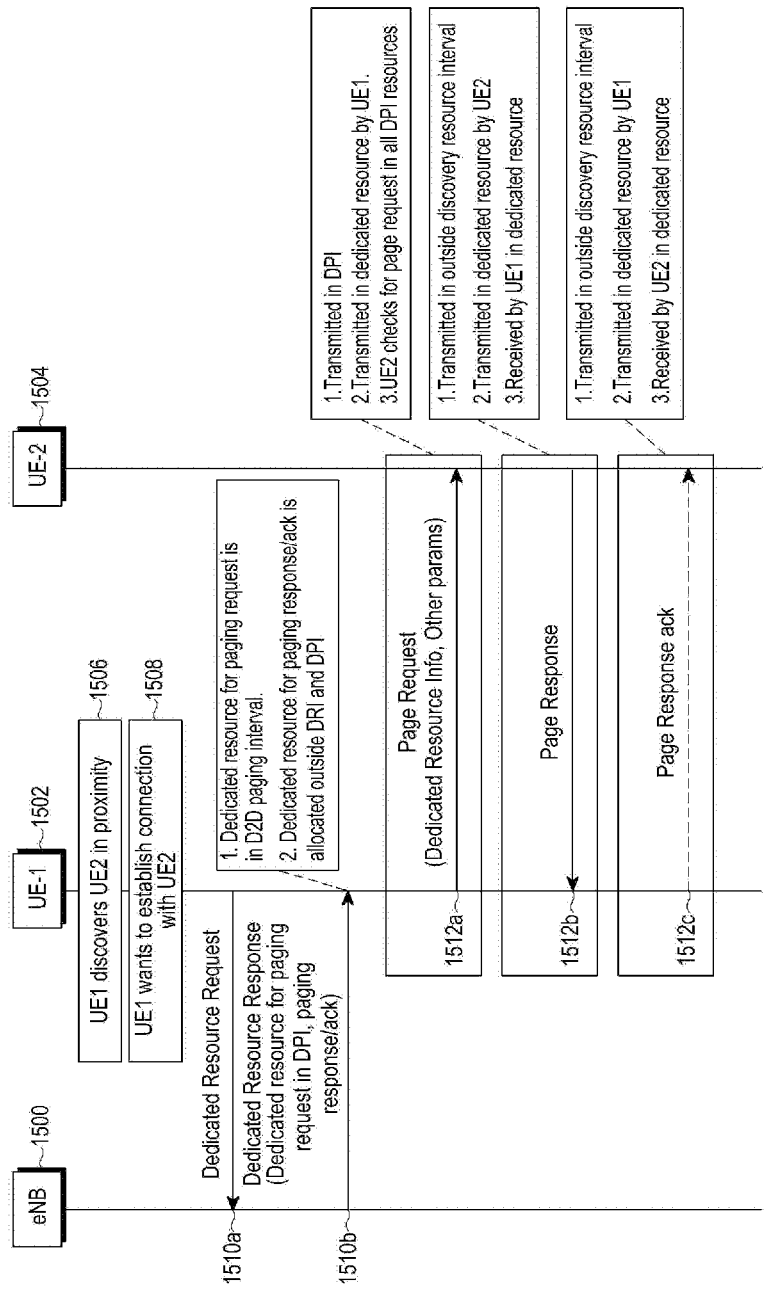
[Figure 15]

【Figure 16a】
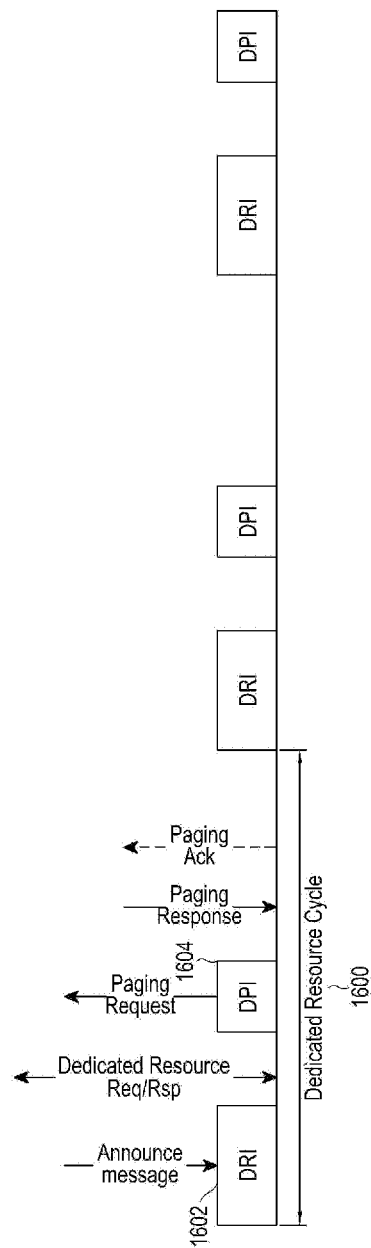

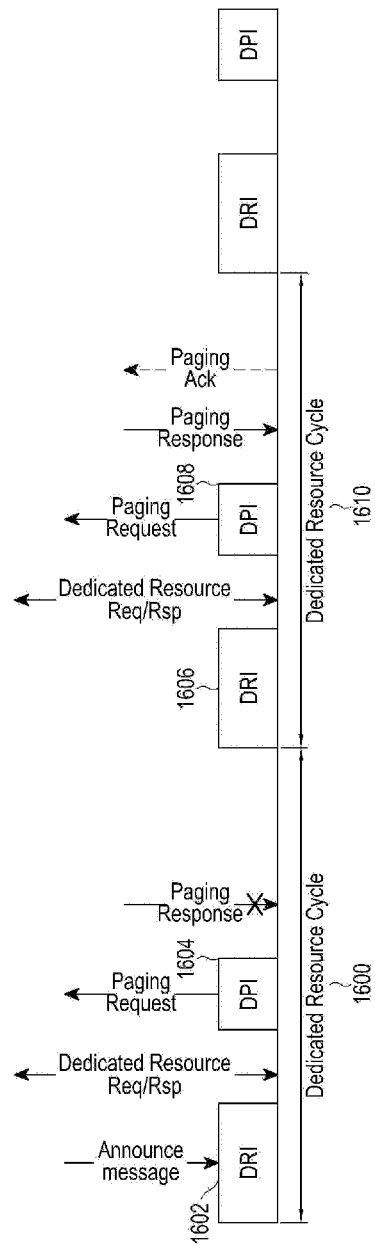
[Figure 16b]

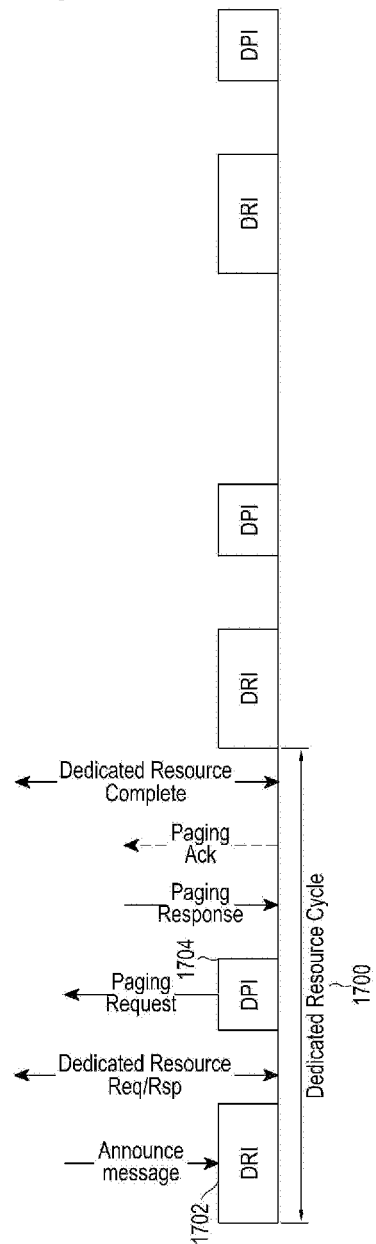
[Figure 17a]

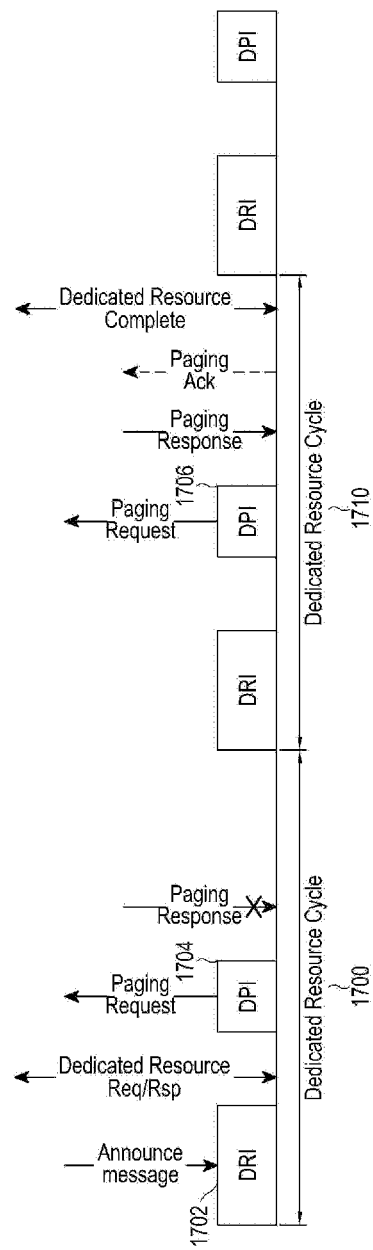

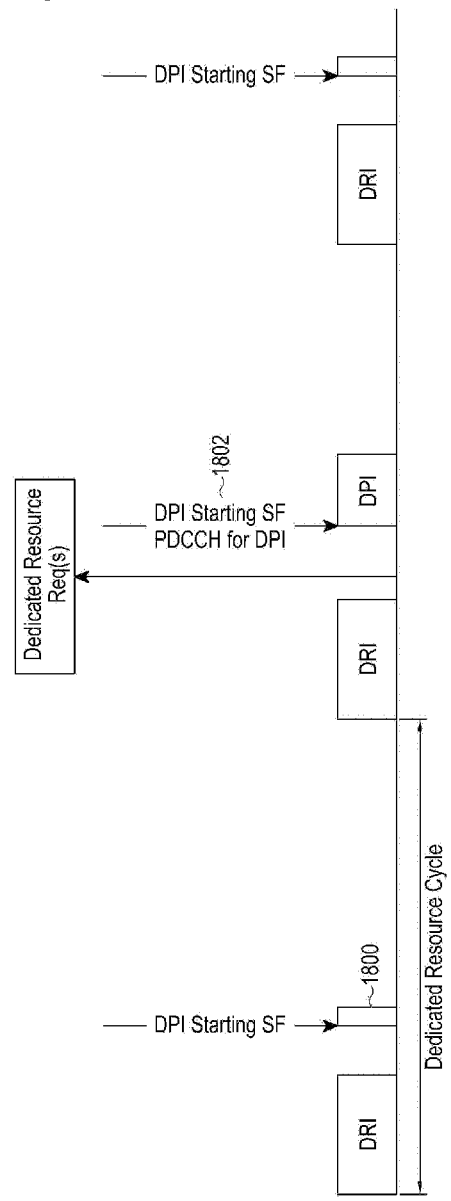
[Figure 18]

[Figure 19a]
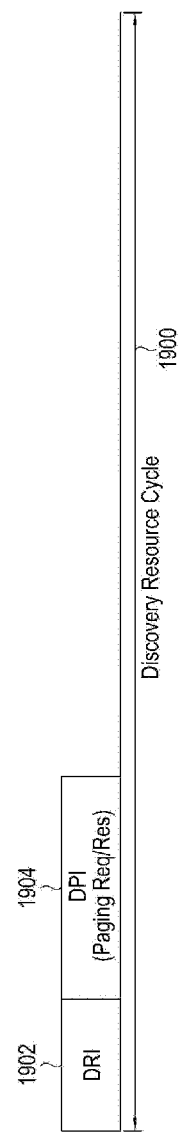

[Figure 19b]
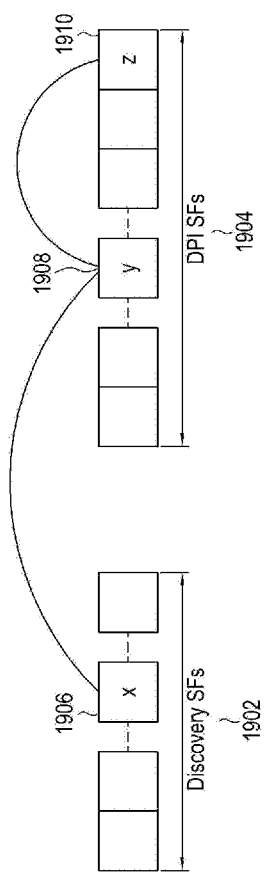

[Figure 20a]
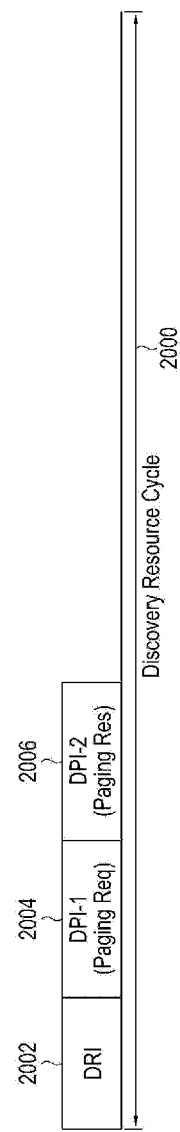

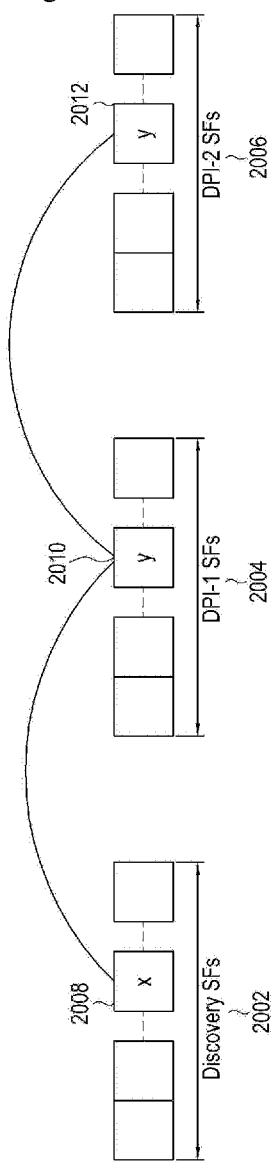

[Figure 21]
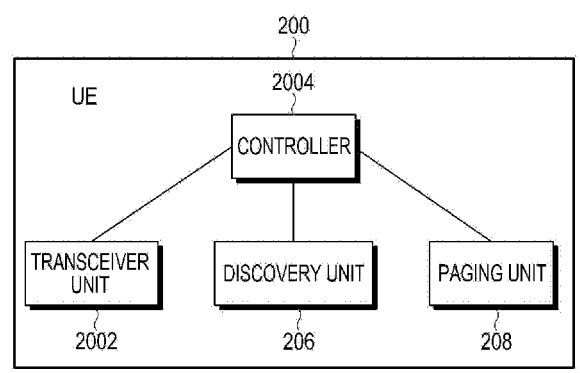

METHOD AND APPARATUS FOR PAGING BETWEEN DEVICES PERFORMING DIRECT COMMUNICATION

PRIORITY

This application is a National Phase Entry of PCT International Application No. PCT/KR2014/010981, which was filed on Nov. 14, 2014, and claims a priority to Indian Patent Application No. 1297/KOL/2013, which was filed on Nov. 14, 2013, the contents of which are incorporated herein by reference.

TECHNICAL FIELD

The present disclosure relates to a method and apparatus for paging between devices performing direct communication.

BACKGROUND ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to perform Device-to-Device (D2D) communication (also known as direct communication), a User Equipment (UE) desiring to perform D2D communication may perform a D2D discovery process for determining whether another UE of its interest (or another D2D-enabled UE) is in proximity thereto.

A D2D UE (hereinafter, referred to as a 'discovering UE') performs the D2D discovery process to discover another D2D UE of its interest in its proximity. For example, a social networking application in a D2D UE may use the D2D discovery process. The D2D discovery may include an operation of enabling the user that uses the social networking application to discover a D2D UE among the UEs of users registered as his/her friends, using his/her D2D UE. The D2D discovery may also include an operation in which a D2D UE of the user that uses the social networking application is discovered even by each of the UEs of the users registered as his/her friends.

As another example, in the case of a discovery application, the D2D discovery may include an operation of discovering, for example, stores/restaurants and the like of its interest in its proximity depending on the user's purpose, using a discovering UE of a given user. The discovery information transmitted through the D2D discovery of the discovering UE may provide one or more of the following objects.

One of the above objects is to enable a user of a D2D application to discover another user having the same interest as his/her own interest within the possible D2D communication distance, using the discovering UE. Herein, the interest may include information about the interests (for example, specific movies, specific places, specific events and specific things) and/or specific user that the user currently desires to search for.

If another user having the same interest is obtained or discovered through the D2D discovery, a discovering UE may establish a dedicated connection for D2D communication with the D2D UE of another user. In order to establish the dedicated connection, the discovering UE should page a UE of discovered another user.

The above information is presented as background information only to assist with an understanding of the present disclosure. No determination has been made, and no assertion is made, as to whether any of the above might be applicable as prior art with regard to the present disclosure.

DISCLOSURE

Technical Problem

The existing technique may use a method in which the discovering UE pages a discovered UE using its communication link to a Base Station (BS). If this approach is used, the significant signaling overhead may occur. Accordingly, a specific approach for efficiently performing paging between D2D UEs is required.

Technical Solution

It is therefore an object of the present disclosure to provide a method and apparatus for paging between devices performing direct communication, which addresses the disadvantages of prior art.

In accordance with an aspect of the present disclosure, there is provided a method for paging between devices performing direct communication. The method includes determining, by a device, a direct connection with a target device performing the direct communication; transmitting, by the device, a dedicated resource request for paging signaling with the target device to a base station; and if dedicated resource information for the paging signaling is received from the base station, transmitting, by the device, a set up request for the direct connection to the target device based on the dedicated resource information.

In accordance with another aspect of the present disclosure, there is provided a method for performing direct communication. The method includes: receiving, by a device, a set up request for a direct connection with the target UE from a target device; determining, by the device, whether dedicated resource information for the direct connection is included in the set up request; and if the dedicated resource information is included in the set up request, transmitting, by the device, a response in response to the set up request based on the dedicated resource information to the target device.

In accordance with an aspect of the present disclosure, there is provided a device for paging between devices performing direct communication, the device comprising: a controller configured to determine a direct connection with a target device performing the direct communication; and a transmitter configured to transmit a dedicated resource request for paging signaling with the target device to a base station, and if dedicated resource information for the paging signaling is received from the base station, the transmitter is configured to transmit, a set up request for the direct connection to the target device based on the dedicated resource information.

In accordance with another aspect of the present disclosure, there is provided a device for serving direct communication between devices, the device comprising: a receiver configured to receive a set up request for a direct connection with the target UE from a target device; a controller configured to determine, whether dedicated resource information for the direct connection is included in the set up request; and if the dedicated resource information is included in the set up request, a transmitter configured to transmit a response in response to the set up request based on the dedicated resource information to the target device.

Other aspects, advantages, and salient features of the disclosure will become apparent to those skilled in the art from the following detailed description, which, taken in conjunction with the annexed drawings, discloses exemplary embodiments of the disclosure.

DESCRIPTION OF DRAWINGS

The above and other aspects, features and advantages of certain exemplary embodiments of the present disclosure will be more apparent from the following description taken in conjunction with the accompanying drawings, in which:

FIGS. 1a and 1b illustrate an example of a general paging operation between D2D UEs;

FIG. 2 illustrates an example of an operation for direct paging between D2D UEs according to a first embodiment of the present disclosure;

FIG. 3a illustrates an example of a combination of UE1 and UE2 information that can be transmitted during the direct paging procedure according to the first embodiment of the present disclosure;

FIG. 3b illustrates another example of a combination of UE1 and UE2 information that can be transmitted during the direct paging procedure according to the first embodiment of the present disclosure;

FIG. 3c illustrates further another example of a combination of UE1 and UE2 information that can be transmitted during the direct paging procedure according to the first embodiment of the present disclosure;

FIG. 4 illustrates an example of a format used for transmission of discovery information in a general D2D discovery process;

FIGS. 5a to 5c illustrate examples of formats of discovery message or PDU according to the first embodiment of the present disclosure;

FIGS. 6a to 6c illustrate another example of a format of discovery message or PDU according to the first embodiment of the present disclosure;

FIGS. 7a to 7c illustrate further another example of a format of discovery message or PDU according to the first embodiment of the present disclosure;

FIG. 8 illustrates another example of a format of discovery message or PDU according to the first embodiment of the present disclosure;

FIG. 9 illustrates an example of an operation for direct paging between D2D UEs according to a second embodiment of the present disclosure;

FIG. 10a illustrates an example of information of UEs, which is signaled in the direct paging procedure between D2D UEs according to the second embodiment of the present disclosure;

FIG. 10b illustrates another example of information of UEs, which is signaled in the direct paging procedure between D2D UEs according to the second embodiment of the present disclosure;

FIG. 10c illustrates further another example of information of UEs, which is signaled in the direct paging procedure between D2D UEs according to the second embodiment of the present disclosure;

FIGS. 11a and 11b illustrate an example of a case where dedicated resources for paging signaling are allocated only once according to the second embodiment of the present disclosure;

FIGS. 12a and 12b illustrate an example of a case where dedicated resources for paging signaling are allocated in a persistent/semi-persistent manner according to the second embodiment of the present disclosure;

FIGS. 13a and 13b illustrate another example of a case where dedicated resources for paging signaling are allocated only once according to the second embodiment of the present disclosure;

FIGS. 14a and 14b illustrate another example of a case where dedicated resources for paging signaling are allocated in a persistent/semi-persistent manner according to the second embodiment of the present disclosure;

FIG. 15 illustrates an example of a paging signaling operation that uses dedicated resources determined using a Dedicated Paging Interval (DPI) in the second embodiment of the present disclosure;

FIGS. 16a and 16b illustrate an example of a case where dedicated resources for paging signaling using a DPI are allocated only once according to the second embodiment of the present disclosure;

FIGS. 17a and 17b illustrate an example of a case where dedicated resources for paging signaling using a DPI are allocated in a persistent/semi-persistent manner according to the second embodiment of the present disclosure;

FIG. 18 illustrates an example of adjusting the size of a DPI according to an embodiment of the present disclosure;

FIGS. 19a and 19b illustrate an example of a relationship between Discovery Resource Interval (DRI) subframes and DPI subframes and an example of a method for selecting resources for page request/response according to a third embodiment of the present disclosure;

FIGS. 20a and 20b illustrate another example of a relationship between DRI subframes and DPI subframes and another example of a method for selecting resources for paging request/response according to the third embodiment of the present disclosure; and FIG. 21 illustrates a structure of a UE according to an embodiment of the present disclosure.

Throughout the drawings, like reference numerals will be understood to refer to like parts, components, and structures.

BEST MODE

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

For Device-to-Device (D2D) communication (or direct communication), a direct connection should be established between D2D UEs. For the direct connection, an operation of paging a discovered D2D UE by a discovering UE should be performed.

FIG. 1a illustrates an example of a general paging operation between D2D UEs.

Referring to FIG. 1a, in operation 114, a UE1 100 or a discovering UE may perform D2D direct discovery to discover a UE2 112 in its proximity. The UE1 100 may obtain an Identifier (ID) of the UE2 112 in the D2D direct discovery process. In this case, the size of discovery information transmitted during process of the direct discovery on a discovery channel may increase due to the ID of the UE2 112. In order to establish a direct connection for D2D communication with the UE2 112, the UE1 100 may send a direct connection request including an ID of the UE1 100 and the obtained ID of the UE2 112 to a Mobility Management Entity 1 (MME1) 104 through the BS1 102 in operations 116a and 116b. The MME1 104 is an entity for managing the mobility of the UE1 100 and the BS1 102.

In operation 118, the MME1 104 may perform an authorization procedure for the direct connection request for D2D communication between the UE1 100 and the UE2 112, with a D2D server 106. In operation 120, the MME1 104 may determine an MME2 108, which is an entity for managing the mobility of the UE2 112, using the ID of the UE2 112. In operation 122, the MME1 104 may send the direct connection request to the determined MME2 108.

For a direct connection between the UE1 100 and the UE2 112, the MME2 108 may page, in operations 124a and 124b, the UE2 112 through a BS2 110 in an area where the UE2 112 is located. The ID of the UE1 100 that has requested the direct request is sent to the UE2 112.

Assuming that the UE2 112 desires to make the direct connection, the UE2 112 may send, in operations 126a and 126b, a direct connection request including its own ID to the MME2 108 through the BS2 110. In operation 128, the MME2 108 may send a response to the direct connection request to the MME1 104. In operations 130a and 130b, the MME1 104 may send the response to the UE1 100 through the BS1 102 so that a direct connection between the UE1 100 and the UE2 112 may be established.

The D2D server 106 or an application server may store information about UEs of the user who has downloaded or used a certain application. To this end, the D2D server 106 or the application server may perform additional signaling with UEs capable of D2D communication. For example, the information about the UEs may include a user ID for the application, a discovery code, a UE ID, etc. If the discovering UE cannot obtain an ID of the discovered UE in the D2D direct discovery process, the discovering UE may obtain the ID of the discovered UE through the D2D server or the application server. FIG. 1b illustrates another example of one of the existing techniques for paging a discovered UE by a discovering UE.

Referring to FIG. 1b, in operation 140, the discovering UE1 100 may obtain or discover the UE2 112 by performing direct D2D discovery like in operation 114 of FIG. 1a. the direct D2D discovery is performed between UE1 100 and the UE2 122, and, the direct D2D discovery does not provide an ID of the UE2 112 during the direct D2D discovery. Then, in operations 142a and 142b, the UE1 100 may send a direct connection request with the UE2 112 to the MME1 104 through the BS1 102. The direct connection request may include an ID of the UE1 100 and information of the UE2 112. The information of the UE2 112 may include an application ID of the UE2 112, a discovery code, and the like, the UE1 100 has obtained the information of the UE2 112 in the direct D2D discovery process. In operation 144, the MME1 104 may access the D2D server 106 and send a request for an ID of the UE2 112 to the D2D server 106. The request for an ID of the UE2 112 may include the ID of the UE1 100 and the information of the UE2 112. In operation 146, based on the pre-stored UE information, the D2D server 106 may determine the ID of the UE2 112, using the information of the UE2 112. In operation 148, the D2D server 106 may send a response including the ID of the UE2 112 to the MME1 104. In operation 150, the MME1 104 may determine the MME2 108 of the UE2 using the obtained ID of the UE2 112. In operation 152, the MME1 104 may send a direct connection request with the UE1 100 and the UE2 112 to the determined MME2 108. The direct connection request may include the ID of the UE1 100 and the ID of the UE2 112. In operations 154a to 160b, the UE2 112 may be paged and the direct connection may be established. Since operations 154a to 160b correspond to operations 124a to 130b, a detailed description thereof will be omitted.

As described above, in order for a discovering UE to page a discovered D2D UE to which the discovering UE will establish a direct connection, the discovering UE should perform additional signaling with its nearby devices (e.g., BS, MME, D2D server and the like). Therefore, in order to reduce the overhead due to the signaling, direct paging between D2D UEs is required.

First Embodiment: Direct Paging Procedure Using Discovery Resources

FIG. 2 illustrates an example of an operation for direct paging between D2D UEs according to a first embodiment of the present disclosure.

Referring to FIG. 2, in operation 204, it is assumed that a UE1 200 has discovered, for example, a UE2 202 by performing D2D discovery. In this case, information of the UE2 202, which may include at least one of, for example, a discovery code, an application user ID, an application ID, a Proximity Service (ProSe) UE ID and a group ID, may be obtained in the D2D discovery process. The group ID represents an ID of the group to which the UE2 202 belongs. In one method operation 204 is optional and UE2 202 information which may include at least one of, for example, a discovery code, an application user ID, an application ID, a Proximity Service (ProSe) UE ID and a group ID, may be obtained by UE1 200 by other means (for example, via ProSe/D2D server or application server). In one method operation 204 is optional and UE1 202 may initiate communication with UE2 204 without discovering UE2 204.

In operation 206, the UE1 200 sends a page request (or communication request or direct connection request) including the information of the UE2 202 to the UE2 202 directly to initiate communication with UE2 202. The information of the UE2 202 includes at least one of, for example, a discovery code, an application user ID, an application ID, a ProSe UE ID and/or a group ID. In accordance with an embodiment of the present disclosure, the information of the UE2 202 included in the page request indicates that the target of the page request is the UE2 202. In addition, the page request (or communication request or direct connection request) may include information of the UE1 200. The information of the UE1 200 may also include at least one of, for example, a discovery code, an application user ID, an application ID, a ProSe UE ID and/or a group ID. In operation 208, upon receiving the page request (or communication request or direct connection request), the UE2 202 may determine whether to accept the request received from UE1 200. If the UE2 202 determines to accept the request, the UE2 202 may send a page response (or communication response or direct connection response) in response to the page request to the UE1 200 in operation 210. The page response may include the information of the UE2 202 and the information of the UE1 200. The information of the UE1 200 indicates that the target, of the page response is the UE1 200. It is assumed in FIG. 2 that in operation 212, the UE1 200 sends an Acknowledgement (ACK) for the reception of the page response to the UE2 202. The ACK for the page response may include the information of the UE1 200 and the information of the UE2 202. In alternative embodiment, the ACK for the page response may not be sent by the UE1 200.

There may be various combinations of UE1 and UE2 information that can be transmitted during the direct paging procedure between D2D UEs according to an embodiment of the present disclosure.

FIG. 3*a* illustrates an example of a combination of UE1 and UE2 information that can be transmitted during the direct paging procedure according to the first embodiment of the present disclosure.

Referring to FIG. 3*a*, in operation 304, a UE1 300 may discover, for example, a UE2 302 by performing a D2D discovery operation like in operation 204 of FIG. 2. In one method operation 304 is optional and UE2 302 information which may include at least one of, for example, a discovery code, an application user ID, an application ID, a Proximity Service (ProSe) UE ID and a group ID, may be obtained by UE1 300 by other means (for example, via ProSe/D2D server or application server). In one method operation 304 is optional and UE1 302 may initiate communication with UE2 304 without discovering UE2 304.

In operation 306, the UE1 300 sends a page request (or communication request or direct connection request) to the UE2 302. The page request may include information of the UE2 302. In the example of FIG. 3*a*, it will be assumed that the information of the UE2 302 includes, for example, a discovery code, an application user ID, and/or an application ID. The information of the UE2 302 in the page request indicates that a target for the page request is the UE2 302. In the example of FIG. 3*a*, it will be assumed that the UE1 300 pages (or initiates communication with) only one UE (e.g., the UE2 302) at a time.

The page request may include a ProSe UE ID as information of the UE1 300. The ProSe UE ID may be used to identify the UE1 in the communication network. In other words, the ProSe UE ID of the UE1 300 may be used to obtain security keys from the communication network, and may be used by the UE1 300 for connection authorization. In accordance with an embodiment, if the UE1 300 is associated with any group, the group ID may be represented as a part of the ProSe UE ID, or may be separately included in the page request.

In operation 308, upon receiving the page request (or communication request or direct connection request), the UE2 202 may determine whether to accept the request received from UE1 200. If the UE2 202 determines to accept the request, in operation 310, the UE2 302 sends a page response (or communication response or direct connection response) in response to the request to the UE1 300. In the example of FIG. 3*a*, the page response may include, for example, a ProSe UE ID of the UE2 302 and a ProSe UE ID of the UE1 300. The ProSe UE ID of the UE1 300 may indicate that the target of page request is the UE1 300. It will be assumed herein that the UE1 300 sends an ACK for the page response to the UE 302 in operation 312 in accordance with an embodiment of the present disclosure. The ACK may include a ProSe UE ID of the UE1 300 and a ProSe UE ID of the UE2 302. In alternative embodiment, the ACK for the page response may not be sent by the UE1 300.

In the example of FIG. 3*a*, it will be assumed that the UE1 300 pages only one UE (e.g., the UE2 302) at a time.

FIG. 3*b* illustrates another example of a combination of UE1 and UE2 information that can be transmitted during the direct paging procedure according to the first embodiment of the present disclosure. The operation in FIG. 3*b*, which a proposed improvement of the operation in FIG. 3*a*, may correspond to a case where the UE1 300 can page (or initiate communication with) a plurality of UEs at a time.

Referring to FIG. 3*b*, in operation 312, a UE1 300 may discover, for example, a UE2 302 by performing a D2D discovery operation like in operation 204 of FIG. 2. In one method operation 312 is optional and UE2 302 information which may include at least one of, for example, a discovery code, an application user ID, an application ID, a Proximity Service (ProSe) UE ID and a group ID, may be obtained by UE1 300 by other means (for example, via ProSe/D2D server or application server). In one method operation 312 is optional and UE1 302 may initiate communication with UE2 304 without discovering UE2 304.

In operation 314, the UE1 300 sends a page request (or communication request or direct connection request) to the UE2 302. The page request may include information of the UE2 302. In the example of FIG. 3*b*, it is assumed that the information of the UE2 302 includes, for example, a discovery code, an application user ID, and/or an application ID. The information of the UE2 302 is used to indicate that a target for the page request is the UE2. The page request may include a ProSe UE ID as information of the UE1 300. In operation 316, upon receiving the page request (or communication request or direct connection request), the UE2 302 may determine whether to accept the request received from UE1 300. If the UE2 302 determines to accept the request, in operation 318, the UE2 302 may send a page response (or communication response or direct connection response) in response to the page request to the UE1 300. The page response may include information of the UE2 302, which is obtained from the page request, and also include a ProSe UE ID of the UE2 302 and a ProSe UE ID of the UE1 300. The ProSe UE ID of the UE1 300 indicates that a target of the page response is the UE1 300. It will be assumed herein that the UE1 300 sends an ACK for the page response to the UE2 302 in operation 320 in accordance with an embodiment of the present disclosure. The ACK may include the same information as that included in the page response. If at least one of the UE1 300 and the UE2 302 is associated with any group, a group ID may be included in the ACK, and the group ID may be included as a part of a ProSe UE ID of the UE, or may be included as a separate value from the ProSe UE ID. In alternative embodiment, the ACK for the page response may not be sent by the UE1 300.

FIG. 3C illustrates further another example of a combination of UE1 and UE2 information that can be transmitted during the direct paging procedure according to the first embodiment of the present disclosure. The example of FIG. 3C is the same as the example of FIG. 3b except that when the UE2 302 sends a page response (or communication response or direct connection response), the ProSe UE ID of the UE2 302 is not included in the page response.

In the example of FIG. 2, it was assumed that information of each of the UE1 300 and the UE2 302 includes a discovery code, an application user ID and/or an application ID. This example may be used when exchange of ProSe UE IDs is not required during the paging procedure.

The paging signaling between a discovering UE and a discovered UE in the first embodiment of the present disclosure, which has been described in FIGS. 2 to 3C, is transmitted/received using a discovery physical channel. Accordingly, discovery resources for D2D discovery according to the first embodiment of the present disclosure may be used not only for transmission of discovery-related information, but also for direct paging-related signaling. FIG. 4 illustrates an example of a format used for transmission of discovery information in a general D2D discovery process.

Referring to FIG. 4, a format of the discovery message or PDU may include, for example, a mode field that is distinguished as soliciting or announcing; a type field indicating at least one of Open, Restricted and ProSe UE ID; and discovery information.

Based on the above-described format in FIG. 4, it is possible to configure not only the discovery information but also the signaling information for direct paging between D2D UEs in the form of FIGS. 5a to 5c in the first embodiment of the present disclosure.

FIGS. 5a to 5c illustrate examples of formats of discovery message or PDU according to the first embodiment of the present disclosure.

Referring to FIG. 5a, a format of the discovery message or PDU according to the first embodiment of the present disclosure may include, for example, a mode field that is distinguished as one of soliciting, announcing and paging; a discovery information type field capable of indicating information that the existing type file indicates, or a paging information type field indicating a paging related messages i.e. request, response, ack; and discovery information or paging information. The paging information type and paging information is present when the mode field is set to paging as illustrated in FIG. 5c. The discovery information type field and discovery information is present when the mode field is set to soliciting or announcing as illustrated in FIG. 5b.

FIGS. 6a to 6c illustrate another example of a format of discovery message or PDU according to the first embodiment of the present disclosure.

Referring to FIG. 6a, another example of a format of the discovery message or PDU according to the first embodiment of the present disclosure may include a type field indicating one of a message type and a PDU type; and an information field. The information field may be differently configured depending on the information indicating the PDU type in the type field. The PDU type included in the type field may indicate whether the information is for discovery or for paging. If the PDU type in the type field indicates discovery, referring to FIG. 6B, the information field may additionally include a mode field indicating soliciting or announcing, and a discovery information type field indicating one of Open, Districted and ProSe UE ID, and may also include discovery information. If the PDU type in the type field indicates paging, referring to FIG. 6C, the information field may include a paging information type field indicating one of Request, Response and ACK; and paging information.

FIGS. 7a to 7c illustrate further another example of a format of discovery message or PDU according to the first embodiment of the present disclosure.

Referring to FIG. 7a, a format of the discovery message or PDU according to the first embodiment of the present disclosure may include a type field indicating a message type or a PDU type, and an information field including a discovery PDU/discovery message or a paging message depending on the value indicated by the PDU type included in the type field. Referring to FIG. 7b, if the PDU type in the type field indicates soliciting and announcing, the information field may include discovery information, and may additionally include a discovery information type field including one of Open, Restricted and ProSe UE ID. Referring to FIG. 7C, if the PDU type in the type field indicates one of Request, Response and ACK for paging, the information field may include paging information corresponding to the paging message.

FIG. 8 illustrates another example of a format of discovery message or PDU according to the first embodiment of the present disclosure.

Referring to FIG. 8, a format of the discovery message or PDU according to the first embodiment of the present disclosure may include, for example, includes a discovery PDU/discovery message or a paging message, and a CRC (Cyclic redundancy check) field indicating whether there is a paging message or a discovery message.

Second Embodiment: Direct Paging Procedure Using Dedicated Resources

In a second embodiment of the present disclosure, discovery resources and non-discovery resources may be used as dedicated resources for direct paging.

FIG. 9 illustrates an example of an operation for direct paging between D2D UEs according to a second embodiment of the present disclosure.

Referring to FIG. 9, it will be assumed that in operation 906, a UE1 902 discovers a UE2 904 by performing D2D discovery, and then desires to establish a direct connection with the discovered UE2 904. In one method operation 906 is optional and UE1 902 may initiate communication with UE2 904 without discovering UE2 904. In operation 908, the UE1 902 sends a dedicated resource request for paging signaling to a BS 900. Then, the BS 900 may allocate dedicated resources for paging signaling of the UE1 902. In one embodiment, the BS 900 may allocate dedicated resources for a paging request, a paging response, and a paging ACK. Note that paging ACK is optional and resources are allocated only if paging ACK is transmitted. In another embodiment, the BS 900 may allocate dedicated resources only for a paging response and a paging ACK. Note that paging ACK is optional and resources are allocated only if paging ACK is transmitted. The BS 900 may allocate dedicated resources for a paging request, using some of the discovery resources. Since the discovery resources are broadcasted from the BS 900, D2D UEs involved in the D2D discovery process may recognize the broadcasted discovery resources. If inter-cell discovery is performed, discovery resources may be synchronized across the cells In this case, it will be assumed that even if the UE1 902 is located in a cell different from the cell of the BS 900 that broadcasts the discovery resources, the UE2 904 can receive a paging request sent by the UE1 902. It will be assumed that if the discovery resources are not synchronized across the cells, the UE2 904 monitors discovery resources of the BS 900 using information about the discovery resources in a neighboring cell. In an embodiment, dedicated resources for a paging response and a paging ACK may be some of the discovery resources. In further another embodiment, dedicated resources for a paging response and a paging ACK may be allocated using non-discovery resources. If the dedicated resources for a paging response and a paging ACK are allocated using the non-discovery resources, the BS 900 will coordinate the resource allocation status with neighboring cells so that the allocated dedicated resources may not be used in the neighboring cells. In accordance with an embodiment of the present disclosure, the discovery resources may be categorized into a common resource zone and a dedicated resource zone. If dedicated resources for paging signaling are allocated from the discovery resources, the dedicated resources may be allocated in the dedicated resource zone. In operation 910, the BS 900 may send, to the UE1 902, a dedicated resource response including information about the dedicated resources allocated for paging signaling. The information about the dedicated resources allocated for paging signaling may be divided into, for example, information for a paging request and information for a paging response/ACK.

Upon receiving the dedicated resource response, the UE1 902 may send a page request to the UE2 904 in operation 912. Based on the dedicated resource response, the UE1 902 may determine whether dedicated resources for a paging request are allocated from the BS 900. If it is determined that the dedicated resources for a paging request are allocated, the UE1 902 may send the page request to the UE2 904 using the dedicated resources. On the other hand, if it is determined that the dedicated resources for a paging request are not allocated, the UE1 902 may select resources for sending a paging request from the discovery resources that have been broadcasted from the BS 900. The page request may include information about the dedicated resources that are allocated by the BS 900 for a paging response and a paging response ACK.

In operation 914, upon receiving the page request, the UE2 904 may send a page response to the UE1 902 using resource information for a paging response and a paging response ACK, which are included in the page request. In operation 916, the UE1 902 may send an ACK for the page response to the UE2 904 using the dedicated resources allocated for the paging response, which are obtained from the dedicated resource response. The paging request, response and ACK in the example of FIG. 9 may equally include the information that is included in the paging request, response and ACK in the examples of FIGS. 2 to 3C, respectively, in addition to the information about dedicated resources. As for the UE1 information and UE2 information, which can be included, many combinations thereof are possible depending on the embodiments. If a paging response and a paging response ACK are send using dedicated resources according to the second embodiment of the present disclosure, information for identifying a UE is not required in the paging response and the paging response ACK, because the information for identifying the UE is already known to the discovering UE and the discovered UEs through allocation of dedicated resources for paging signaling, in an embodiment of the present disclosure.

FIG. 10*a* illustrates an example of information of UEs, which is signaled in the direct paging procedure between D2D UEs according to the second embodiment of the present disclosure. In the example of FIG. 10*a*, a ProSe UE ID needs to be exchanged between UEs.

Referring to FIG. 10*a*, it will be assumed that in operation 1004, a UE1 1000 has discovered a UE2 1002 located in proximity thereto by performing D2D discovery. Further, it will be assumed that in operation 1006, the UE1 1000 has determined to establish a direct connection with the UE2 1002. Then, in operation 1008*a*, the UE1 1000 may send a page request to the UE2 1002. The page request may include a ProSe UE ID of the UE1 1000, dedicated resource information, and information of the UE2 1002 that the UE1 1000 obtained in the discovery processor in operation 1004. The dedicated resource information is information about the dedicated resources that the UE1 1000 has obtained from a BS by sending a request for dedicated resources for paging signaling to the paging UE, like in operations 908 and 910 in FIG. 9. The dedicated resource information may be divided into information for a paging request and information for a paging response/ACK according to an embodiment of the present disclosure. Depending on the embodiment, some of the discovery resources may be allocated or non-discovery resources may be allocated.

The information of the UE2 1002 may include, for example, a discovery code, an application user ID and/or an application ID. Then, in operation 1008*b*, the UE2 1002 may send a page response including its own ProSe UE ID to the UE1 1000. Upon receiving the page response, the UE1 1000 may send a page response ACK to the UE2 1002 in operation 1008*c*.

FIG. 10*b* illustrates another example of information of UEs, which is signaled in the direct paging procedure between D2D UEs according to the second embodiment of the present disclosure.

Referring to FIG. 10*b*, operations 1010 to 1014*c* may be performed in the same way as operations 1004 to 1008*c* in FIG. 10*a* according to the second embodiment of the present disclosure. However, it will be assumed in FIG. 10*b* that the ProSe UE ID of the UE2 1002, which was discovered in the D2D discovery process, has already been received. Accordingly, when sending a page response in operation 1014*b*, the UE2 1002 may not include or insert the ProSe UE ID of the UE2 1002 in the page response, unlike in FIG. 10*a*.

FIG. 10*c* illustrates further another example of information of UEs, which is signaled in the direct paging procedure between D2D UEs according to the second embodiment of the present disclosure.

Referring to FIG. 10*c*, operations 1020 to 1024*c* may also be performed in the same way as operations 1004 to 1008*c* in FIG. 10*a* according to the second embodiment of the present disclosure. However, it will be assumed in FIG. 10*c* that the ProSe UE ID exchanged between UEs is not required. Accordingly, a page request and a page response in FIG. 10c are different from those in FIG. 10a in that a page request in operation 1024a does not include a ProSe UE ID of the UE1 1000 and a page response in operation 1024b does not include ProSe UE ID of the UE2 1002.

The dedicated resources for paging signaling according to the second embodiment of the present disclosure may be allocated only once, or may be allocated in a semi-persistent manner.

FIGS. 11a and 11b illustrate an example of a case where dedicated resources for paging signaling are allocated only once according to the second embodiment of the present disclosure. Referring to FIG. 11a, for example, a UE1 or a discovering UE receives an announce message that a UE2 sent in a Discovery Resource Interval (DRI) 1100, the UE1 may be aware of information about the discovery resources allocated by the BS1, The announce message is a discovery message sent by UE2 during discovery process. The discovery message carries discovery information like interest, discovery code/UE ID, application ID, etc. Then, the UE1 may exchange dedicated resource request and response for paging signaling with a BS during a discovery resource cycle as described in operations 908 and 910 in FIG. 9, using the discovery resources. In the example of FIG. 11a, it will be assumed that a BS has allocated dedicated resources for paging signaling in a DRI. Then, in the next DRI 1102, the UE1 may perform paging signaling on a discovered UE using the dedicated resources obtained from the response. In other words, the UE1 may perform a process of sending and receiving paging request, response and ACK therefor to/from a UE (e.g., a UE2) that is discovered by performing D2D discovery. It can be assumed that in the next DRI 1102, after sending a paging request to the UE2 using dedicated resources, the UE1 fails to receive a paging response from the UE2. In this case, referring to FIG. 11b, the UE1 may re-send a dedicated resource request for paging signaling to the BS during the next discovery resource cycle as described in operations 908 and 910 in FIG. 9. Upon receiving a response to the re-sent dedicated resource request from the BS, the UE1 may perform again the paging signaling procedure using the dedicated resources that the UE1 has obtained from the response in a coming DRI 1104. The obtained dedicated resources may be allocated in a DRI, and they may be the same as or different from the previously allocated dedicated resources.

FIGS. 12a and 12b illustrate an example of a case where dedicated resources for paging signaling are allocated in a persistent/semi-persistent manner according to the second embodiment of the present disclosure.

Referring to FIG. 12a, for example, a UE1 or a discovering UE receives an announce message that a UE2 sent in a DRI 1200. The UE1 is aware of information about the discovery resources allocated by the BS1. Then, the UE1 may exchange dedicated resource request and response for paging signaling with a BS during a discovery resource cycle as described in operations 908 and 910 in FIG. 9, using the discovery resources. The UE1 may receive persistent/semi-persistent dedicated resources for paging signaling in the discovery resource cycle. It will be assumed even in the example of FIG. 12a that a BS has allocated dedicated resources for paging signaling in a DRI. Accordingly, the UE1 may perform paging signaling using the persistent/semi-persistent dedicated resources in the next DRI 1202. In other words, the UE1 may perform a process of sending and receiving paging request, response and ACK therefor to a UE2 that is discovered by performing D2D discovery.

It can be assumed that in the DRI 1202, after sending a paging request to the UE2 using the dedicated persistent/semi-persistent dedicated resources, the UE1 fails to receive a paging response from the UE2. In this case, referring to FIG. 12b, the UE1 may re-send a paging request using the persistent/semi-persistent dedicated resources in the next DRI 1204. If the paging response is received UE1 can send the dedicated resource complete message to BS for releasing the allocated resources.

FIGS. 13a and 13b illustrate another example of a case where dedicated resources for paging signaling are allocated only once according to the second embodiment of the present disclosure. In the example of FIGS. 13a and 13b, it will be assumed that dedicated resources for a paging request are allocated in a DRI, and dedicated resources for paging response and ACK are allocated in an interval other than the DRI.

Referring to FIG. 13a, like in FIGS. 11a and 11b, a UE1 or a discovering UE receives an announce message that a UE2 sent in a DRI 1300. The UE1 is aware of information about the discovery resources allocated by the BS1. Then, the UE1 may exchange dedicated resource request and response for paging signaling with a BS during a discovery resource cycle as described in operations 908 and 910 in FIG. 9, using the discovery resources. The UE1 may obtain dedicated resources allocated in the DRI for a paging request from the response according to an embodiment of the present disclosure, and in a DRI 1302, the UE1 may send a paging request to the UE (e.g., a UE2) to the UE1 discovered in the D2D discovery process using the obtained dedicated resources. Upon recognizing the dedicated resources for a paging response and an ACK, which are obtained from the response, the UE1 may receive a paging response and send an ACK therefor to the UE2, in an interval other than the DRI.

In some cases, after sending a paging request in the DRI 1302, the UE1 may fail to receive a paging response from the UE2 in an interval other than the DRI. In this case, referring to FIG. 13b, the UE1 may re-send a dedicated resource request for paging signaling in the discovery resource cycle. Upon receiving a response to the re-sent dedicated resource request from the BS, the UE1 may perform again the paging signaling procedure using the dedicated resources that the UE1 has obtained from the response in a coming DRI 1304. In other words, the UE1 may send a paging request using dedicated resources for a paging request, which are obtained from the response and allocated in the DRI, may receive a paging response using the dedicated resources allocated in an interval other than the DRI obtained from the response, and may send an ACK therefor to the UE2. Herein, the dedicated resources for paging signaling that the UE1 has obtained in response to the re-sent request may be the same as or different from the dedicated resources that the UE1 has received in response to the initial transmission.

FIGS. 14a and 14b illustrate another example of a case where dedicated resources for paging signaling are allocated in a persistent/semi-persistent manner according to the second embodiment of the present disclosure. In the example of FIGS. 14a and 14b, it will be assumed that dedicated resources for a paging request are allocated in a DRI, and dedicated resources for a paging response and an ACK are allocated in an interval other than the DRI.

Referring to FIG. 14a, for example, a UE1 or a discovering UE receives an announce message that a UE2 sent in a DRI 1400. The UE1 may be aware of information about the discovery resources allocated by the BS1. Then, the UE1 may exchange dedicated resource request and response for paging signaling with a BS during a discovery resource cycle as described in operations 908 and 910 in FIG. 9, using the discovery resources. The UE1 may obtain dedicated resources allocated in a DRI for a paging request from the response in accordance with an embodiment of the present disclosure, and send a paging request to the UE (e.g., a UE2) discovered in a D2D discovery process using the obtained dedicated resources in a DRI 1402. Upon recognizing the dedicated resources for a paging response and an ACK, which are obtained from the response, the UE1 may receive a paging response and send an ACK therefor to the UE2, in an interval other than the DRI.

In some cases, after sending a paging request to the UE2 using the allocated persistent/semi-persistent dedicated resources in the DRI 1402, the UE1 may fail to receive a paging response from the UE2 in an interval other than the DRI. In this case, referring to FIG. 14B, the UE1 may re-send a paging request using the persistent/semi-persistent dedicated resources in the next DRI 1404. If the paging response is received UE1 can send the dedicated resource complete message to BS for releasing the allocated resources.

The format for discovery information and paging-related signaling according to the second embodiment of the present disclosure may be configured as described in FIGS. 5a to 8.

The dedicated resources for paging signaling according to the second embodiment of the present disclosure may be determined using a Dedicated Paging Interval (DPI) according to another embodiment of the present disclosure.

FIG. 15 illustrates an example of a paging signaling operation that uses dedicated resources determined using a DPI in the second embodiment of the present disclosure. Herein, a DPI starts at a predetermined location. For example, a DPI may start at a fixed location in a discovery resource cycle. The size of the DPI may be may be fixed, or may be dynamically updated. The location of DPI and DPI configuration (time and frequency resources) is signalled (broadcasted or unicasted) by network. Alternately, the DPI can be set of discovery resources or discovery resource pool which is indicated by network or base station to be used for paging signaling. The DPI may contain resources for sending a paging request. In alternate embodiment, a paging response and a paging ACK may also be sent in the DPI. The resources to be used for paging signaling in a DPI are allocated by the BS.

Referring to FIG. 15, it will be assumed that in operation 1506, a UE1 1502 has discovered, for example, a UE2 1504 in proximity thereto by performing D2D discovery. The operation 1506 is optional and UE1 1502 may initiate communication with UE2 1504 without discovering UE2 1504. In operation 1508, the UE1 1502 determines to establish a direct connection with the UE2 1504. In operation 1510a, the UE1 1502 may send a dedicated resource request for paging signaling to a BS (or eNB) 1500. In response, the BS 1500 may allocate resources for paging signaling. If inter-cell discovery is supported, the BS 1500 will coordinate use resources with neighboring BSs for allocating resources for paging signaling. In the example of FIG. 15, it will be assumed that the BS 1500 allocates resources for a paging request in a predetermined DPI and allocates resources for a paging response and an ACK outside a DRI and a DPI. Accordingly, discovery resources are not used for paging request. In operation 1510b, the BS 1500 may send a dedicated resource response including information about the allocated dedicated resources for paging signaling to the UE1 1502. Thereafter, in operation 1512a, the UE1 1502 may send a page request to the UE2 1504 using the dedicated resources which are obtained from the dedicated resource response and allocated in a DPI. The page request may include information about the dedicated resources obtained from the dedicated resource response The UE2 1504 monitor all resources in the DPI to receive a page request. In operation 1512b, the UE2 1504 may send a page response using the resources allocated outside a DRI and a DPI, using information about the dedicated resources obtained from the page request. In operation 1512c, the UE1 1502 may also send an ACK to the UE2 1504 using the resources, which are obtained from the response and allocated outside a DRI and a DPI. In alternative embodiment, a paging response and an ACK may be sent using the resources allocated in a DPI, and the BS 1500 may allocate dedicated resources for the paging response and ACK in a DPI. A DPI according to another embodiment may be divided into a first region where resources for a paging request are allocated, and a second region where resources for a paging response are allocated.

The dedicated resources for paging signaling, which are allocated using a DPI according to the second embodiment of the present disclosure, may also be allocated once or in a semi-persistent manner depending on the embodiment.

FIGS. 16a and 16b illustrate an example of a case where dedicated resources for paging signaling using a DPI are allocated only once according to the second embodiment of the present disclosure. In the example of FIGS. 16a and 16b, a DPI may start at a predetermined location in a discovery resource cycle, and have a fixed size. The size of the DPI may be adjusted based on the number of dedicated resource requests received from UEs and in this case the UEs may find Physical Downlink Control Channel (PDCCH) delivery information concerning the DPI configuration in a first subframe of the DPI. Alternately the DPI configuration can be broadcasted by the BS.

Referring to FIG. 16a, for example, a UE1 or a discovering UE receives an announce message that a UE2 sent in a DRI 1602 of a discovery resource cycle 1600. Then, the UE1 may exchange dedicated resource request and response for paging signaling with a BS during a discovery resource cycle as described in operations 1510a and 1510b in FIG. 15, using the discovery resources. In the example of FIGS. 16a and 16b, it will be assumed that dedicated resource request and response are performed in an interval between a DRI and a DPI in a discovery resource cycle.

The UE1 may obtain resources for a paging request, which are allocated in the DPI, from the response, and transmit resource information for the paging request to the discovered UE2.

Then, the UE2 may transmit discovery information in the DRI 1602, and monitor reception of a paging request sent from the UE1 in a DPI 1604 located in the discovery resource cycle 1600. After discovering the UE2 in the D2D discovery process, the UE1 may send a dedicated resource request for paging signal to the BS. Therefore, in this embodiment, the starting point of a DPI should be located at a point where the UE1 can secure a long time to request dedicated resources from the BS and receive a response thereto. The UE1 may send the paging request to the UE2 using the dedicated resources for a paging request, which are obtained from the response and allocated in the DPI 1604. The UE1 may receive a paging response from the UE2 using the resources obtained from the response, which are located in the discovery resource cycle 1600 but allocated outside the DPI 1604, and send an ACK therefor to the UE2.

In some cases, the UE1 may fail to receive a paging response to the paging request that the UE1 sent in the DPI 1604. In this case, referring to FIG. 16b, the UE1 may re-send a dedicated resource request for paging signaling outside the DRI 1602 of the next discovery resource cycle 1610, and receive a response thereto. Then, the UE1 may send a paging request to the UE2 in a DPI 1608 of the next discovery resource cycle 1610 to correspond to the dedicated resources for a paging request, which are obtained from the response. Similarly, the UE1 may receive a paging response from the UE2 using the resources received through a response to the re-sent dedicated resource request, which are located in the next discovery cycle 1610 but allocated outside the DPI 1608, and may send an ACK therefor to the UE2. If the ACK is sent to the UE2, the UE1 may send a complete message to the BS in order to request release of the resource allocation information obtained from the response to the re-sent dedicated resource request.

FIGS. 17a and 17b illustrate an example of a case where dedicated resources for paging signaling using a DPI are allocated in a persistent/semi-persistent manner according to the second embodiment of the present disclosure. It will be assumed in FIGS. 17a and 17b that the allocated dedicated resources for paging signaling are allocated in the same way as in FIGS. 16a and 16b.

Referring to FIG. 17a, for example, a UE1 or a discovering UE receives an announce message that a UE2 sent in a DRI 1702 of a discovery resource cycle 1700. Then, the UE1 may exchange dedicated resource request and response for paging signaling with a BS during a discovery resource cycle as described in operations 1510a and 1510b in FIG. 15, using the discovery resources. Even in the example of FIGS. 17a and 17b, it will be assumed that dedicated resource request and response are performed in an interval between a DRI and a DPI in a discovery resource cycle.

The UE1 may send a paging request using the resources for a paging request, which are obtained from the response and allocated in a DPI 1704 in the discovery resource cycle 1700. The UE1 may receive a paging response using the resources, which are obtained from the response and allocated outside the DPI 1704 in the discovery resource cycle 1700, and send an ACK therefor to the discovered UE2. In the example of FIGS. 17a and 17b, the dedicated resources obtained from the response to the dedicated resource request are the resources which are allocated in a persistent/semi-persistent manner. Therefore, if no paging response to the paging request that is sent in the DPI 1704 is received, the UE1 in FIG. 17b may not re-send a dedicated resource request. In the next discovery resource cycle 1710, the UE1 may perform paging signaling using the resources that are allocated in a persistent/semi-persistent manner. In other words, the UE1 may send a paging request in a DPI 1706 in the next discovery resource cycle 1710, may receive a paging response using the resources allocated outside the DPI 1706 in the discovery resource cycle 1710, and may send an ACK therefor to the discovered UE2. The UE1 may send a complete message to the UE in order to request release of the resource allocation information allocated in a persistent/semi-persistent manner.

In alternative embodiment, the size of the DPI may be dynamically adjusted based on the number of dedicated resource requests received from UEs.

FIG. 18 illustrates an example of adjusting the size of a DPI according to an embodiment of the present disclosure.

Referring to FIG. 18, UEs, for which dedicated resources for paging signaling using a DPI are allocated, may find PDCCHs carrying information about DPI setting in a Downlink (DL) subframe 1802 having a fixed offset at a start 1800 of an Uplink (UL) subframe of the DPI. It should be noted that a DPI starting point according to an embodiment of the present disclosure is in a predetermined location. Therefore, if DPI-based dedicated resources are allocated to a page request, the UE should monitor PDCCHs carrying information about the DPI setting in order to receive the page request.

Third Embodiment: Direct Paging Procedure Using Resources in DPI

In a third embodiment of the present disclosure, a Paging Interval (PI) may be defined, and resources including a PI and locations thereof are broadcasted by a BS. The location of the PI may be set in advance, or may be received from a ProSe server. The location of the PI according to an embodiment of the present disclosure may start right after discovery resources, or may have an offset from the discovery resources. The paging interval can be set of discovery resources or discovery resource pool which is indicated by network or base station to be used for paging signaling. The PI according to an embodiment of the present disclosure may be divided into a region for sending a paging request and a region for sending a paging response. Alternately two types of PI can be there, one for sending paging request and another for sending paging response.

FIGS. 19a nd 19b illustrate an example of a relationship between DRI subframes and DPI subframes and an example of a method for selecting resources for page request/response according to a third embodiment of the present disclosure.

Referring to FIG. 19a, for example, a discovery resource cycle 1900 may include a DRI 1902, and a DPI 1904 succeeding the DRI 1902. It will be assumed that resources for paging signaling are allocated in the DPI 1904. Referring to FIG. 19b, the DRI 1902 may be configured with a plurality of subframes for D2D discovery, and the DPI 1904 may also be configured with a plurality of subframes for performing direct paging signaling according to an embodiment of the present disclosure.

In one of the above methods, a page request for a UE discovered using the discovery signal received in an x-th discovery subframe 1906 in FIG. 19b may be sent with a y-th DPI subframe 1908 wherein yth DPI subframe is location is predetermined with respect to x-th discovery subframe 1906. A page response to the page request that is sent in the y-th DPI subframe 1908 may be received in a z-th DPI subframe 1910 wherein zth DPI subframe is location is predetermined with respect to y-th discovery subframe 1906.

In another one of the above methods, a page request may be received in all resources of a DPI, and the resources may be randomly selected by UE sending the paging request. A page response to the page request may be sent in all resources of a DPI, and the resources may also be randomly selected by UE sending the paging response.

In further another method, the page request may be sent in all resources of a DPI, and the resources may be randomly selected. A page response to the page request that is sent in the y-th DPI subframe 1908 may be received in the z-th DPI subframe 1910 wherein zth DPI subframe is location is predetermined with respect to y-th discovery subframe 1908.

FIGS. 20a and 20b illustrate another example of a relationship between DRI subframes and DPI subframes and another example of a method for selecting resources for paging request/response according to the third embodiment of the present disclosure.

Referring to FIG. 20a, for example, a discovery resource cycle 2000 may include a DRI 2002, and a DPI succeeding the DRI 2002. The DPI may be divided into a first DPI 2004 for a paging request and a second DPI 2006 for a paging response. Referring to FIG. 20*b*, the DRI 2002 may be configured with a plurality of subframes for D2D discovery, and each of the first DPI 2004 and the second DPI 2006 may be configured with a plurality of subframes for performing direct paging signaling according to an embodiment of the present disclosure.

In one of the above methods, a page request for a UE discovered using the discovery signal that is received in an x-th discovery subframe 2008 may be sent with a y-th subframe 2010 among the subframes of the first DPI 2004. A page response to the page request that is sent in the y-th subframe 2010 may be received in a z-th subframe 2012 among the subframes of the second DPI 2006.

In another method, a page request may be sent in all resources of the first DPI 2004, and the resources may be randomly selected by UE sending the paging request. A page response to the page request may be sent in all resources of the second DPI 2006, and the resources may also be randomly selected by UE sending the paging response.

In further another method, the page request may be sent in all resources of the first DPI 2004, and the resources may be randomly selected by UE sending the paging request. A page response to the page request that is sent in the y-th subframe 2010 of first DPI 2004 may be received in the z-th subframe 2012 among the subframes of the second DPI 2006. The z-th subframe 2012 is determined with respect to y-th subframe 2010. For example, if 'y' the subframe is the second subframe in first DPI 2004 then 'zth' subframe in second DPI 2006 is the second subframe in second DPI 2006.

FIG. 21 illustrates a structure of a UE according to an embodiment of the present disclosure.

Referring to FIG. 21, a UE 2100 may include a transceiver 2102, a controller 2104, a discovery unit 2106 and a paging unit 2108. The structure of the UE 2100 in FIG. 21 is a mere example, and components of the UE 2100 may be subdivided into a plurality of subunits or some of the components may be merged, depending on the embodiment of the present disclosure or the intention of the manufacturer.

The UE 2100 in FIG. 21 may operate as the above-described discovering UE according to an embodiment of the present disclosure, or may operate as a UE discovered by the discovering UE.

First, it will be assumed that the UE 2100 operates as a discovering UE according to an embodiment of the present disclosure. The UE 2100 may operate as a UE1 according to embodiments of the present disclosure. Then, the controller 2104 in the UE 2100 may control the transceiver 2102 and the discovery unit 2106, to perform a discovery operation. If a UE2 is discovered through the discovery operation, the controller 2104 may determine a direct connection with the UE2. The controller 2104 may perform paging signaling with the UE2 through the transceiver 2102 and the paging unit 2108. If the UE 2100 operates according to the first embodiment, the paging unit 2108 and the transceiver 2102 may send and receive signaling for paging request, response and ACK using a discovery physical channel. Since detailed operations thereof have been described in FIGS. 2 to 3C, a detailed description thereof will be omitted. If the UE 2100 operates according to the second embodiment, the controller 2104 may send, to a BS, a dedicated resource request for paging signaling with the discovered UE2. Upon receiving a response to the dedicated resource request through the transceiver 2102, the controller 2104 may control the paging unit 2108 to perform paging signaling using the dedicated resources obtained from the response. Since detailed operations for paging signaling according to the second embodiment have been described in FIGS. 9 to 18, a detailed description thereof will be omitted. As described above, as for the dedicated resources according to the second embodiment, some of the discovery resources may be used, or non-discovery resources may be allocated. The dedicated resources may be allocated once each time the dedicated resource request is received, or may be allocated in a persistent/semi-persistent manner. The resources may be allocated to be distinguishable for each of request, response and ACK constituting paging signaling.

Finally, if a predetermined PI is allocated according to the third embodiment, the controller 2104, which has recognized obtaining of the PI-related information through the transceiver 2102, may control the paging unit 2108 to perform paging signaling with the UE2 based on the PI-related information. Since detailed operations thereof also have been described in FIGS. 19 to 20*b*, a detailed description thereof will be omitted.

As for the UE 2100, a discovering UE according to an embodiment of the present disclosure may operate as a discovered UE2. In this case, the controller 2104 may control the paging unit 2108 to perform paging signaling with the discovering UE, using the resources for paging signaling according to an embodiment of the present disclosure. Since detailed operations thereof also have been described before, a detailed description thereof will be omitted.

As is apparent from the foregoing description, in embodiments of the present disclosure, paging between UEs performing direct communication using discovery resources or dedicated resources may be performed by the UEs, contributing to a reduction in the signaling overhead occurring due to the existing paging procedure.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A paging method in a direct communication system, the method comprising:
   determining, by a user device, a direct connection with a target user device for performing direct communication;
   transmitting, by the user device, a dedicated resource request for a page request, a page response, and a page acknowledgement (ACK) to a base station;
   after receiving resource information about resources allocated for the page request, the page response, and the page ACK from the base station, determining, by the user device, whether a resource allocated for the page request for the direct connection is a first dedicated resource based on the resource information;
   after determining that the resource allocated for the page request is the first dedicated resource, transmitting, by the user device, the page request to the target user device through the first dedicated resource; and
   receiving, by the user device, the page response to the page request from the target user device through a second dedicated resource allocated for the page response,
   wherein the page request includes resource information about the second dedicated resource and a third dedicated resource for the page ACK which are included in the resource information.

2. The method of claim 1, further comprising:
after determining that the resource allocated for the page request is not the first dedicated resource, selecting, by the user device, one of discovery resources allocated from the base station; and
transmitting, by the user device, the page request to the target user device through the selected discovery resource.

3. The method of claim 1, further comprising:
transmitting, by the user device, the page ACK for the page response to the target user device through the third dedicated resource.

4. A user device for performing direct communication, the user device comprising:
a processor configured to determine a direct connection with a target user device for performing the direct communication; and
a transceiver configured to transmit a dedicated resource request for a page request, a page response, and a page acknowledgement (ACK) to a base station,
wherein, after resource information about resources allocated for the page request, the page response, and the page ACK is received from the base station, the processor is configured to determine whether a resource allocated for the page request for the direct connection is a first dedicated resource based on the resource information,
wherein, after the processor determines that the resource allocated for the page request is the first dedicated resource, the transceiver is configured to transmit the page request to the target user device through the first dedicated resource, and to receive the page response to the page request from the target user device through a second dedicated resource allocated for the page response, and
wherein the page request includes resource information about the second dedicated resource and a third dedicated resource for the page ACK which are included in the resource information.

5. The user device of claim 4, wherein, the processor is further configured to select one of discovery resources allocated from the base station after determining that the resource allocated for the page request is not the first dedicated resource, and
wherein the transmitter is configured to transmit the page request to the target user device through the selected discovery resource.

6. The user device of claim 5, wherein the transmitter is configured to transmit the page ACK for the page response to the target user device through the third dedicated resource.

* * * * *